(12) United States Patent
Stern et al.

(10) Patent No.: US 9,703,006 B2
(45) Date of Patent: Jul. 11, 2017

(54) METHOD AND SYSTEM FOR CREATING HISTORY MATCHED SIMULATION MODELS

(75) Inventors: David Stern, Houston, TX (US); Adedayo S. Oyerinde, Sugar Land, TX (US); Isha Sahni, Houston, TX (US); Ganesan S. Subramanian, Bellaire, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 432 days.

(21) Appl. No.: 13/513,816

(22) PCT Filed: Nov. 15, 2010

(86) PCT No.: PCT/US2010/056725
§ 371 (c)(1),
(2), (4) Date: Jun. 4, 2012

(87) PCT Pub. No.: WO2011/100009
PCT Pub. Date: Aug. 18, 2011

(65) Prior Publication Data
US 2012/0253770 A1    Oct. 4, 2012

Related U.S. Application Data

(60) Provisional application No. 61/304,001, filed on Feb. 12, 2010.

(51) Int. Cl.
*G06G 7/48* (2006.01)
*G01V 11/00* (2006.01)
(Continued)

(52) U.S. Cl.
CPC .......... *G01V 11/00* (2013.01); *G06F 17/5009* (2013.01); *E21B 43/00* (2013.01);
(Continued)

(58) Field of Classification Search
None
See application file for complete search history.

(56) References Cited

U.S. PATENT DOCUMENTS 5,871,047 A    2/1999  Spath et al.
6,094,619 A    7/2000  Noetinger et al.
(Continued)

FOREIGN PATENT DOCUMENTS

EP    1301812    10/2005
GB    2428820    9/2008
(Continued)

OTHER PUBLICATIONS

C.D. White, et al., "Identifying and Estimating Significant Geologic Parameters with Experimental Design," Journal of the Society of Petroleum Engineers, Sep. 2001, pp. 311 324.*
(Continued)

*Primary Examiner* — Aniss Chad
*Assistant Examiner* — David M Rogers
(74) *Attorney, Agent, or Firm* — ExxonMobil Upstream Research—Law Department

(57) ABSTRACT

A method for matching production history to flow simulations includes identifying a plurality of parameters that control an objective function measuring the mismatch between a flow simulation response in a parameter subspace and a production history. A value is calculated for an objective function and for a static measurement at each of a plurality of experiments in the parameter subspace. These results are used to develop a mathematical relationship between one or more static measurements and the objective function. During subsequent adjustment of the simulation model, a target window in the objective function is identified, and flow simulations are performed for each modified model that is predicted from the static geologic measure-
(Continued)

ment to produce an objective function within the window. An objective function of each flow simulation to the production history is calculated and the procedure is iterated until the objective function is within a target range.

21 Claims, 17 Drawing Sheets

(51) Int. Cl.
| | |
|---|---|
| G06F 17/50 | (2006.01) |
| G01V 99/00 | (2009.01) |
| E21B 43/16 | (2006.01) |
| E21B 43/00 | (2006.01) |
| G06F 17/18 | (2006.01) |
| E21B 47/00 | (2012.01) |
| G06Q 10/06 | (2012.01) |
| G01V 1/28 | (2006.01) |
| G05B 13/02 | (2006.01) |

(52) U.S. Cl.
CPC ............ E21B 43/16 (2013.01); E21B 47/00 (2013.01); G01V 1/282 (2013.01); G01V 99/005 (2013.01); G01V 2210/66 (2013.01); G01V 2210/663 (2013.01); G05B 13/024 (2013.01); G06F 17/18 (2013.01); G06F 17/50 (2013.01); G06F 2217/16 (2013.01); G06Q 10/063 (2013.01)

(56) References Cited

U.S. PATENT DOCUMENTS

| | | | |
|---|---|---|---|
| 6,662,109 B2 | 12/2003 | Roggero et al. | |
| 6,674,432 B2 | 1/2004 | Kennon et al. | |
| 6,823,296 B2 | 11/2004 | Rey-Fabret et al. | |
| 6,826,483 B1 | 11/2004 | Anderson et al. | |
| 6,941,255 B2 | 9/2005 | Kennon et al. | |
| 6,980,940 B1 | 12/2005 | Gurpinar et al. | |
| 7,006,951 B2 | 2/2006 | Pond, Jr. et al. | |
| 7,027,964 B2 | 4/2006 | Kennon et al. | |
| 7,043,413 B2 | 5/2006 | Ward et al. | |
| 7,062,420 B2 | 6/2006 | Poe, Jr. | |
| 7,114,557 B2 | 10/2006 | Cudmore et al. | |
| 7,149,671 B2 | 12/2006 | Lim et al. | |
| 7,225,078 B2 | 5/2007 | Shelley et al. | |
| 7,260,508 B2 | 8/2007 | Lim et al. | |
| 7,277,796 B2 | 10/2007 | Kuchuk et al. | |
| 7,363,163 B2 | 4/2008 | Valec-Dupin et al. | |
| 7,369,973 B2 | 5/2008 | Kennon et al. | |
| 7,369,979 B1 | 5/2008 | Spivey | |
| 7,478,024 B2 | 1/2009 | Gurpinar et al. | |
| 7,539,625 B2 | 5/2009 | Klumpen et al. | |
| 7,548,873 B2 | 6/2009 | Veeningen et al. | |
| 7,584,081 B2 | 9/2009 | Wen et al. | |
| 7,596,480 B2 | 9/2009 | Fung et al. | |
| 7,657,494 B2 | 2/2010 | Wilkinson et al. | |
| 7,725,302 B2 | 5/2010 | Ayan et al. | |
| 7,739,089 B2 | 6/2010 | Gurpinar et al. | |
| 7,752,022 B2 | 7/2010 | Fornel et al. | |
| 7,788,074 B2 | 8/2010 | Scheidt et al. | |
| 7,805,283 B2 | 9/2010 | Zangl et al. | |
| 7,835,893 B2 | 11/2010 | Cullick et al. | |
| 7,953,585 B2 | 5/2011 | Gurpinar et al. | |
| 7,970,593 B2 | 6/2011 | Roggero et al. | |
| 8,285,532 B2 | 10/2012 | Zangl et al. | |
| 8,335,677 B2 | 12/2012 | Yeten et al. | |
| 8,412,501 B2 | 4/2013 | Oury et al. | |
| 8,423,338 B2 | 4/2013 | Ding et al. | |
| 8,676,557 B2 | 3/2014 | Ding et al. | |
| 8,712,746 B2 | 4/2014 | Tillier et al. | |
| 8,862,450 B2 | 10/2014 | Derfoul et al. | |
| 2007/0016389 A1* | 1/2007 | Ozgen | 703/10 |
| 2007/0027666 A1* | 2/2007 | Frankel | 703/10 |
| 2007/0118346 A1 | 5/2007 | Wen et al. | |
| 2007/0156377 A1 | 7/2007 | Gurpinar et al. | |
| 2007/0179768 A1* | 8/2007 | Cullick et al. | 703/10 |
| 2007/0198234 A1 | 8/2007 | Zangl et al. | |
| 2007/0274155 A1 | 11/2007 | Ikelle | |
| 2008/0077371 A1* | 3/2008 | Yeten et al. | 703/10 |
| 2008/0082469 A1* | 4/2008 | Wilkinson et al. | 706/13 |
| 2008/0162100 A1 | 7/2008 | Landa | |
| 2008/0243447 A1 | 10/2008 | Roggero et al. | |
| 2009/0084545 A1 | 4/2009 | Banerjee et al. | |
| 2009/0234625 A1 | 9/2009 | Zangl et al. | |
| 2009/0260880 A1 | 10/2009 | Thambynayagam et al. | |
| 2010/0076740 A1 | 3/2010 | Kuchuk et al. | |
| 2010/0161300 A1 | 6/2010 | Yeten et al. | |
| 2010/0185427 A1* | 7/2010 | Tilke et al. | 703/10 |
| 2012/0232865 A1 | 9/2012 | Maucec et al. | |
| 2012/0265512 A1 | 10/2012 | Hu et al. | |
| 2013/0311158 A1* | 11/2013 | Dasari | G01V 99/005 703/10 |

FOREIGN PATENT DOCUMENTS

| | | |
|---|---|---|
| GB | 2448256 | 11/2008 |
| WO | WO 2005/074592 | 8/2005 |
| WO | WO 2005/076124 | 8/2005 |
| WO | WO 2006/127151 | 11/2006 |
| WO | WO 2007/007210 | 1/2007 |
| WO | WO 2007/089829 | 8/2007 |
| WO | WO 2007/098087 | 8/2007 |
| WO | WO 2007/106244 | 9/2007 |
| WO | WO 2008/036664 | 3/2008 |

OTHER PUBLICATIONS

L.M. Hirsch, et al., "Graph Theory Applications to Continuity and Ranking in geologic Models," Computers and Geosciences, vol. 25, 1999, pp. 127-139.*

Karimi-Fard M, et al., "An Efficient Discrete Fracture Model Applicable for General Purpose Reservoir Simulators," SPE Reservoir Simulation Symposium 2003, Jan. 1, 2003, Society of Petroleum Engineers, 11 pages.*

Boberg, T.C., et al. (1990), "History Matching: Testing the Validity of the Reservoir Model", SPE, pp. 87-98, and Appendix D: Regression Analysis in Automatic History Matching, Reservoir Simulation, pp. 154-159.

Chen, W.H. et al. (1974), "A New Algorithm for Automatic History Matching", SPEJ, pp. 593-608.

Deutsch, C.V. et al. (1994), Practical Considerations in the Application of Simulated Annealing to Stochastic Simulation, Mathematical Geology, 26(1), pp. 67-82.

Dubost, F.X. et al. (2004), "Analysis and numerical modeling of wireline pressure tests in thin-bedded turbidites", J. of Petroleum Science & Engineering, 45, pp. 247-261.

Ewing, R.E. et al. (1994), "Estimating Parameters in Scientific Computation—A Survey of Experience from Oil and Groundwater Modeling", IEEE Computational Science & Engineering, pp. 19-31.

Ghoniem, S.A. et al. (1984), "A simplified method for petroleum reservoir history matching", Appl. Math. Modeling, 8, pp. 282-287.

He, Z. et al. (2002), "Streamline-Based Production Data Integration with Gravity and Changing Field Conditions", SPE Journal, pp. 423-436.

Hovadik, J.M. et al. (2007), "Static characterizations of reservoirs: refining the concepts of connectivity and continuity", Petroleum Geoscience, 13, pp. 195-211.

Jones, D.R. et al. (1998), "Efficient Global Optimization of Expensive Black-Box Functions", Journal of Global Optimization, 13, pp. 455-492.

Kolda, T.G. et al. (2003), "Optimization by Direct Search: New Perspectives on Some Classical and Modern Methods", SIAM Review, 45(3), pp. 385-482.

Landa, J.L. (1997) "Reservoir Parameter Estimation Constrained to Pressure Transients, Performance History and Distributed Saturation Data", a Dissertation, pp. 1-274.

(56) References Cited

OTHER PUBLICATIONS

Queipo, N.V. et al. (2000), "Surrogate Modeling-Based Optimization for the Integration of Static and Dynamic Data into a Reservoir Description", SPE 63065, 2000 SPE Annual Technical Conf. & Exh., Dallas, TX, 10 pgs.
Schulze-Riegert, R.W. et al. (2002), "Evolutionary Algorithms Applied to History Matching of Complex Reservoirs", SPE 77301, Apr. 2002 SPE Reservoir Evaluation & Engineering, pp. 163-173.
Skinner, R.C. et al. (2004), "Simulation-Based EOR Evaluation of a North Sea Field", SPE 90307, SPE Annual Technical Conf. & Exh., Houston, Texas, 7 pgs.
Stern, D. (2005), "Practical Aspects of Scaleup of Simulation Models", SPE 89032, Society of Petroleum Engineers, pp. 74-81.

\* cited by examiner

200

400

(a)

(b)

600

700

800

| Case Number | ntg0.txt | ntg1.txt | flt34.txt | unit01.txt | table0.txt | table1.txt |
|---|---|---|---|---|---|---|
| 1 | -1 | -1 | -1 | -1 | -1 | -1 |
| 2 | 1 | -1 | -1 | -1 | -1 | -1 |
| 3 | -1 | 1 | -1 | -1 | -1 | -1 |
| 4 | 1 | 1 | -1 | -1 | -1 | -1 |
| 5 | -1 | -1 | 1 | -1 | -1 | -1 |
| 6 | 1 | -1 | 1 | -1 | -1 | -1 |
| 7 | -1 | 1 | 1 | -1 | -1 | -1 |
| 8 | 1 | 1 | 1 | -1 | -1 | -1 |
| 9 | -1 | -1 | -1 | 1 | -1 | -1 |
| 10 | 1 | -1 | -1 | 1 | -1 | -1 |
| 11 | -1 | 1 | -1 | 1 | -1 | -1 |
| 12 | 1 | 1 | -1 | 1 | -1 | -1 |
| 13 | -1 | -1 | 1 | 1 | -1 | -1 |
| 14 | 1 | -1 | 1 | 1 | -1 | -1 |
| 15 | -1 | 1 | 1 | 1 | -1 | -1 |
| 16 | 1 | 1 | 1 | 1 | -1 | -1 |
| 17 | -1 | -1 | -1 | -1 | 1 | -1 |
| 18 | 1 | -1 | -1 | -1 | 1 | -1 |
| 19 | -1 | 1 | -1 | -1 | 1 | -1 |
| 20 | 1 | 1 | -1 | -1 | 1 | -1 |
| 21 | -1 | -1 | 1 | -1 | 1 | -1 |
| 22 | 1 | -1 | 1 | -1 | 1 | -1 |
| 23 | -1 | 1 | 1 | -1 | 1 | -1 |
| 24 | 1 | 1 | 1 | -1 | 1 | -1 |
| 25 | -1 | -1 | -1 | 1 | 1 | -1 |
| 26 | 1 | -1 | -1 | 1 | 1 | -1 |
| 27 | -1 | 1 | -1 | 1 | 1 | -1 |
| 28 | 1 | 1 | -1 | 1 | 1 | -1 |
| 29 | -1 | -1 | 1 | 1 | 1 | -1 |
| 30 | 1 | -1 | 1 | 1 | 1 | -1 |
| 31 | -1 | 1 | 1 | 1 | 1 | -1 |
| 32 | 1 | 1 | 1 | 1 | 1 | -1 |

| Case Number | ntg0.txt | ntg1.txt | flt34.txt | unit01.txt | table0.txt | table1.txt |
|---|---|---|---|---|---|---|
| 33 | -1 | -1 | -1 | -1 | -1 | 1 |
| 34 | 1 | -1 | -1 | -1 | -1 | 1 |
| 35 | -1 | 1 | -1 | -1 | -1 | 1 |
| 36 | 1 | 1 | -1 | -1 | -1 | 1 |
| 37 | -1 | -1 | 1 | -1 | -1 | 1 |
| 38 | 1 | -1 | 1 | -1 | -1 | 1 |
| 39 | -1 | 1 | 1 | -1 | -1 | 1 |
| 40 | 1 | 1 | 1 | -1 | -1 | 1 |
| 41 | -1 | -1 | -1 | 1 | -1 | 1 |
| 42 | 1 | -1 | -1 | 1 | -1 | 1 |
| 43 | -1 | 1 | -1 | 1 | -1 | 1 |
| 44 | 1 | 1 | -1 | 1 | -1 | 1 |
| 45 | -1 | -1 | 1 | 1 | -1 | 1 |
| 46 | 1 | -1 | 1 | 1 | -1 | 1 |
| 47 | -1 | 1 | 1 | 1 | -1 | 1 |
| 48 | 1 | 1 | 1 | 1 | -1 | 1 |
| 49 | -1 | -1 | -1 | -1 | 1 | 1 |
| 50 | 1 | -1 | -1 | -1 | 1 | 1 |
| 51 | -1 | 1 | -1 | -1 | 1 | 1 |
| 52 | 1 | 1 | -1 | -1 | 1 | 1 |
| 53 | -1 | -1 | 1 | -1 | 1 | 1 |
| 54 | 1 | -1 | 1 | -1 | 1 | 1 |
| 55 | -1 | 1 | 1 | -1 | 1 | 1 |
| 56 | 1 | 1 | 1 | -1 | 1 | 1 |
| 57 | -1 | -1 | -1 | 1 | 1 | 1 |
| 58 | 1 | -1 | -1 | 1 | 1 | 1 |
| 59 | -1 | 1 | -1 | 1 | 1 | 1 |
| 60 | 1 | 1 | -1 | 1 | 1 | 1 |
| 61 | -1 | -1 | 1 | 1 | 1 | 1 |
| 62 | 1 | -1 | 1 | 1 | 1 | 1 |
| 63 | -1 | 1 | 1 | 1 | 1 | 1 |
| 64 | 1 | 1 | 1 | 1 | 1 | 1 |
| 65 | 0 | 0 | 0 | 0 | 0 | 0 |

METHOD AND SYSTEM FOR CREATING HISTORY MATCHED SIMULATION MODELS

CROSS-REFERENCE TO RELATED APPLICATION

This application is the National Stage entry under 35 U.S.C. 371 of PCT/US2010/056725 that published as WO 2011/100009 and was filed on 15Nov. 2010 which claims the benefit of U.S. Provisional Application No. 61/304,001, filed on 12 Feb. 2010, each of which is incorporated by reference, in its entirety, for all purposes.

FIELD

Exemplary embodiments of the present techniques relate to a method and system predicting performance of hydrocarbon reservoirs by modeling the performance of reservoirs and improving the subsurface models through matching to performance data.

BACKGROUND

This section is intended to introduce various aspects of the art, which may be associated with exemplary embodiments of the present techniques. This discussion is believed to assist in providing a framework to facilitate a better understanding of particular aspects of the present techniques. Accordingly, it should be understood that this section should be read in this light, and not necessarily as admissions of prior art.

Numerical models, referred to as reservoir simulation models or simulation models, may be used to predict performance of hydrocarbon reservoirs. For example, production rates from individual wells may be estimated as a function of time given the well locations and production strategy (rates, pressures at wells, well management information, and the like). Generally, the estimation may be performed by a reservoir simulator, which is a computer program configured to solve equations representing conservation of mass subject to the boundary conditions set at wells and reservoir boundaries. Simulation models are the inputs to the simulator. These simulation models include model parameters within a subsurface model.

Simulation models describe the geometry and properties (such as permeability or porosity, which are the model parameters within the simulation model) of geologic formations that make up the reservoir, the flow and volumetric properties of the reservoir fluids, and the wellbore locations and flow capacities. Simulation models are used to conduct numerical experiments (called simulations) regarding future performance of the field, which are typically used to determine the most profitable operating strategy. For example, the results of simulation may be useful for determining the effects of changing injection pressures, converting injectors to producers, converting producers to injectors, drilling more wells to the reservoir and producing from or injecting to them, and the like.

Improvements to the simulation models may be made by history matching. History matching is the adjustment of the parameters in the simulation models so the predictions of field behavior are consistent with historical production data. As discussed herein, the terms "production data" and "production history" both refer to any data that may be measured over the life of the field. The results of the simulation with the simulation model should be consistent with available production data because this increases the likelihood that predictions of future field behavior are accurate.

A typical process or workflow used in history matching may involve copying an initial simulation model, making some change to that model (adjusting porosity or permeability, for example), running the simulation, and calculating objective function values from the results of the simulation. As discussed in detail below, objective function is a quantitative measure of how well the simulation result matches the historical production data. An example of an objective function is the sum of the error squared over time, where the error is the difference between a field measurement of production rate and the simulation model prediction of the same rate. Perfect agreement between model predictions and field measurements gives an objective function of zero. The process of history matching involves adjusting model parameters to get acceptably low values of the objective function. Once the workflow is specified and parameters that can be adjusted to get a match are identified, optimization algorithms are used to make modifications to the simulation model so the simulation results match with field production data (for example, the simulation results are within a tolerance threshold relative to the production data).

Manual history matching is a time consuming process, highly dependent on the skill and knowledge of a reservoir engineer. As a result, the quality of simulation models produced can be highly variable, depending on the knowledge of the reservoir engineer. By automating parts of the history matching process, the time required to find an acceptable match may be reduced. Further, history matching may be made more systematic by using experimental designs (, systematic exploration of the parameter space) to better understand which parameters influence the match and by using optimization programs to more methodically vary those parameters to improve the match. This is generally termed "assisted history matching" (AHM) and involves developing and automating workflows for history matching and using optimization algorithms to adjust appropriate parameters to improve the match.

Various techniques have been used to assist in history matching. For example, U.S. Patent Application Publication No. 2008/0082469 by Wilkinson, et al., discloses a method for forecasting the production of a petroleum reservoir utilizing genetic programming to construct history matching and forecasting proxies for reservoir simulators. Acting as surrogates for computer simulators, the genetic programming proxies evaluate a large number of simulation models and predict future production forecasts for petroleum reservoirs. A similar optimization technique is disclosed in SPE90307, "Simulation-Based EOR Evaluation of a North Sea Field," by R. C. Skinner, G. R. Jerauld, and M. D. Bush, which uses genetic algorithms to create multiple history-matched simulation models.

However, a disadvantage of these approaches is the significant number of simulations that have to be performed (in the hundreds or even thousands), which is quite time consuming. For this reason, understanding what parameters affect the match can be difficult and screening the simulation models for geologic consistency can be time-consuming. In addition, running many simulations can involve significant computing resources.

Reducing the number of cells in simulation models by making the cells larger may decrease the computational time for performing these simulations, which allows more simulations to be completed in a short period of time. However, this procedure, termed "coarsening," may decrease the accuracy of the simulation models by artificially reducing heterogeneity while also rendering models unable to accurately represent large changes in pressure and saturation near wells.

U.S. Patent Application Publication No. 2007/0198234 by Zangl, et al., discloses a method for history matching a simulation model using self organizing maps to generate regions in the simulation model. The method includes: (a) defining regions exhibiting similar behavior in the simulation model thereby generating the simulation model having a plurality of regions, each of the plurality of regions exhibiting a similar behavior; (b) introducing historically known input data to the simulation model; (c) generating output data (for example, performing a simulation) from the simulation model in response to the historically known input data; (d) comparing the output data from the simulation model with a set of historically known output data; (e) adjusting the simulation model when the output data from the simulation model does not correspond to the set of historically known output data, the adjusting step including the step of arithmetically changing each of the regions of the simulation model; and (f) repeating steps (b), (c), (d), and (e) until the output data from the simulation model does correspond to the set of historically known output data. While this method provides a way to parameterize a model, it does not reduce the number of simulations required to be run.

Other approaches to reducing the number of simulations required to obtain a history match have included running a smaller number of simulations and using those results to create a surrogate, often referred to as a proxy or a response surface, for the simulation. See, for example, J. L. Landa, "Reservoir Parameter Estimation Constrained to Pressure Transients, Performance History, and Distributed Saturation Data," Ph.D. Thesis, Stanford University Department of Petroleum Engineering, (June, 1997); Queipo, et al., "Surrogate modeling-based optimization for the integration of static and dynamic data into a reservoir description," SPE 63065; Ghoniem, S. A., Aliem, S. A., and El Salaly, M., "A simplified method for petroleum reservoir history matching," Applied Mathematical Modeling, 8 (August, 1984); and Hoivadik, J. M., and Lame, D. K., "Static characterizations of reservoirs: refining the concepts of connectivity and continuity," Petroleum Geoscience, 13, 195 (2007). Related information may also be found in U.S. Patent Application Publication Nos. 2007/0027666 and 2007/0198234 and International Patent Application Publication Nos. WO/2007/106244, WO/2006/127151, WO/2005/076124, and WO/2005/074592.

In the surrogate approach, the optimization program may use the surrogate function to search for a history match (for example, indicated by a low value of an objective function), instead of running detailed simulations. Usually the surrogate is a simple mathematical function whose coefficients have been adjusted to fit the response provided by the simulator. The references cited above use several different methods to generate the simulator response. For example, a surrogate may be developed by fitting simple algebraic expressions to the response observed from the simulator, by interpolating between values determined from simulation response using a procedure called kriging, through the use of neural networks, or by spline fitting a simple curve determined by a regression analysis. However, all of these examples involve an empirical expression to represent the simulation response, with no link to the physical process the simulation represents.

As such, the need exists for an enhanced process of assisted history matching. Such a process may include a surrogate that retains some representation of the physical process of flow through the reservoir, allowing for a decrease in the number of simulation runs to improve the results and ease of calculating an assisted history match simulation.

Further related information about assisted history matching may be found in: C. C. Mattax and R. L. Dalton, "Reservoir Simulation," SPE Monograph Volume 13, (1990); Ewing, R. E, Pilant, M. S, Wade, J. G., and Watson, A. T., "Estimating Parameters in Scientific Computation: A Survey of Experience from Oil and Groundwater Modeling," IEEE Computational Science & Engineering, 1(3), (1994); W. H. Chen et al. "A New Algorithm for Automatic History Matching," SPEJ (December, 1971); Z. He and A. Datta-Gupta, and S. Yoon, "Streamline-Based Production Data Integration with Gravity and Changing Field Conditions," SPEJ, 7, 423-436 (December, 2002); R. W. Schulze-Riegert, J. K. Axmann, O. Haase, D. T. Rian, Y. L. You, "Evolutionary Algorithms Applied to History Matching of Complex Reservoirs," SPE Reservoir Evaluation and Engineering (April, 2002); Deutsch, C. V., and Cockerham, P. W., "Practical Considerations in the Application of Simulated Annealing to Stochastic Simulation," Mathematical Geology, 26, 67-82 (1994); Dubost, F. X., Zheng, S. Y., and Corbett, P. W. M., "Analysis and numerical modeling of wireline pressure tests in thin-bedded turbidites," Journal of Petroleum Science and Engineering, 45, 247-261, 2004; T. G. Kolda, R. M. Lewis, and V. Torczon, "Optimization by Direct Search: New Perspectives on Some Classical and Modern Methods," SIAM Review, 45, 385-482 (2003); and Queipo et al., "Surrogate modeling-based optimization for the integration of static and dynamic data into a reservoir description," SPE 63065. Other related information may be found in: Jones et al., Efficient global optimization of expensive black-box functions, Journal of Global Optimization 14, pp 455-492, 1998; and Stern, David, "Practical aspects of Scaleup of Simulation Models," Journal of Petroleum Technology (September, 2005).

SUMMARY

An exemplary embodiment of the present techniques provides a method for enhancing a production history matching process. The method includes obtaining production data and an initial subsurface model. An experimental design is determined that includes one or more model parameter sets, wherein the results of executing the experimental design are used to measure relationships between a connectivity measure and an objective function. A value for a static geologic measurement is calculated at each of the model parameter sets. At least one flow simulation is performed with the experimental design to generate results. A screening filter is determined based at least in part on one or more of the production data, the static geologic measurement, or the generated results. A history match process is performed using the screening filter to run the flow simulation that satisfies the screening filter. The screening filter may include the connectivity measure and the objective function. Determining the experimental design may include identifying a plurality of parameters that control an objective function between a response of the flow simulation and a production history.

Determining the screening filter can include identifying a target window in the objective function, determining a relationship between the static geological measurements and the objective function, and determining from the relationship a range of values for the static geological measurement wherein an objective function will be within the target window. Identifying the target window may include selecting ranges for the objective function that encompass a minimum. Performing the history match process may include iterating to reduce the objective function by calculating an associated static geological measurement for each new parameter set, and running the flow simulation for the model parameter sets in which a value for an objective function is predicted to be within a current target window based at least in part upon the static geologic measurement.

The method may also include identifying a new target window in the objective function, wherein the new target window is smaller than the current target window. A new plurality of experiments may be determined to explore a smaller parameter subspace. The static geologic measurement may be performed at each of the new plurality of experiments. The value of the objective function may be estimated for each static geologic measurement from the relationship determined earlier between the objective function and the static geologic measurement. The flow simulation can be performed for each experiment for which the value of the objective function is within the new target window. The objective function for each flow simulation to the production history can then be calculated.

The model parameter sets may include fault transmissibility, net-to-gross, porosity, permeability, unit transmissibility, or any combinations thereof. The static geologic measurement may include a measurement of the connectivity in a geologic model. The connectivity may include transmissibility, pore volume, drainage volume, shortest-path cost, minimum transit time, or any combinations thereof. A shortest path algorithm may be performed to obtain each static geologic measurement.

The experimental design may include a screening design, a full or fractional factorial design, a Latin hypercube design, a D-Optimal design, or any combinations thereof. The relationship between a static geologic measurement and objective function may include rate mismatch as a function of drainage volume between wells, breakthrough time mismatch as a function of drainage volume between wells, early-time pressure at injectors as a function of permeability-thickness, pressure decline as a function of fault block pore volume, pressure decline as a function of fault seal, or any combinations thereof.

Another exemplary embodiment provides a method for producing hydrocarbons from a field that includes generating a reservoir simulation model that is matched to a production history from the field by using a static geologic measurement as a surrogate for flow simulations in a calculation of a value for an objective function. The method also includes performing flow simulations for one or more model parameter sets that are indicated as being within a target window by the value of the objective function calculated from the static geologic measurements. The reservoir model is adjusted to optimize the objective function. Control of hydrocarbon production from the field is adjusted based at least in part on the reservoir model.

Adjusting the control of hydrocarbon production from the field based at least in part on the reservoir simulation model may include changing injection pressures, converting injectors to producers, converting producers to injectors, drilling more wells to the reservoir, or any combinations thereof. The static geologic measurements may include transmissibility, pore volume, drainage volume, minimum cumulative inverse transmissibility between wells or between a well and a cell representing a portion of the reservoir, transit time, or any combinations thereof.

Another exemplary embodiment of the present techniques provides a tangible, machine-readable medium that includes code configured to direct a processor to calculate a value for a static geologic measurement at each of a plurality of experiments in a parameter subspace, perform a flow simulation for each experiment that produces an static geological measurement within a target window, and calculate the objective function of each flow simulation to a production history.

The tangible, machine-readable medium may also include code configured to direct the processor to iterate using an optimization procedure until the objective function is within a target range. Further, the tangible, machine-readable medium may include code configured to direct the processor to minimize the objective function for the static geologic model and run a flow simulation at a set of parameters identified with the optimum.

DESCRIPTION OF THE DRAWINGS

The advantages of the present techniques are better understood by referring to the following detailed description and the attached drawings, in which:

FIGS. 10A and 10B show a chart illustrating a full factorial experimental design that was performed on the six factors, in accordance with an embodiment of the present techniques;

DETAILED DESCRIPTION

Figure 1:
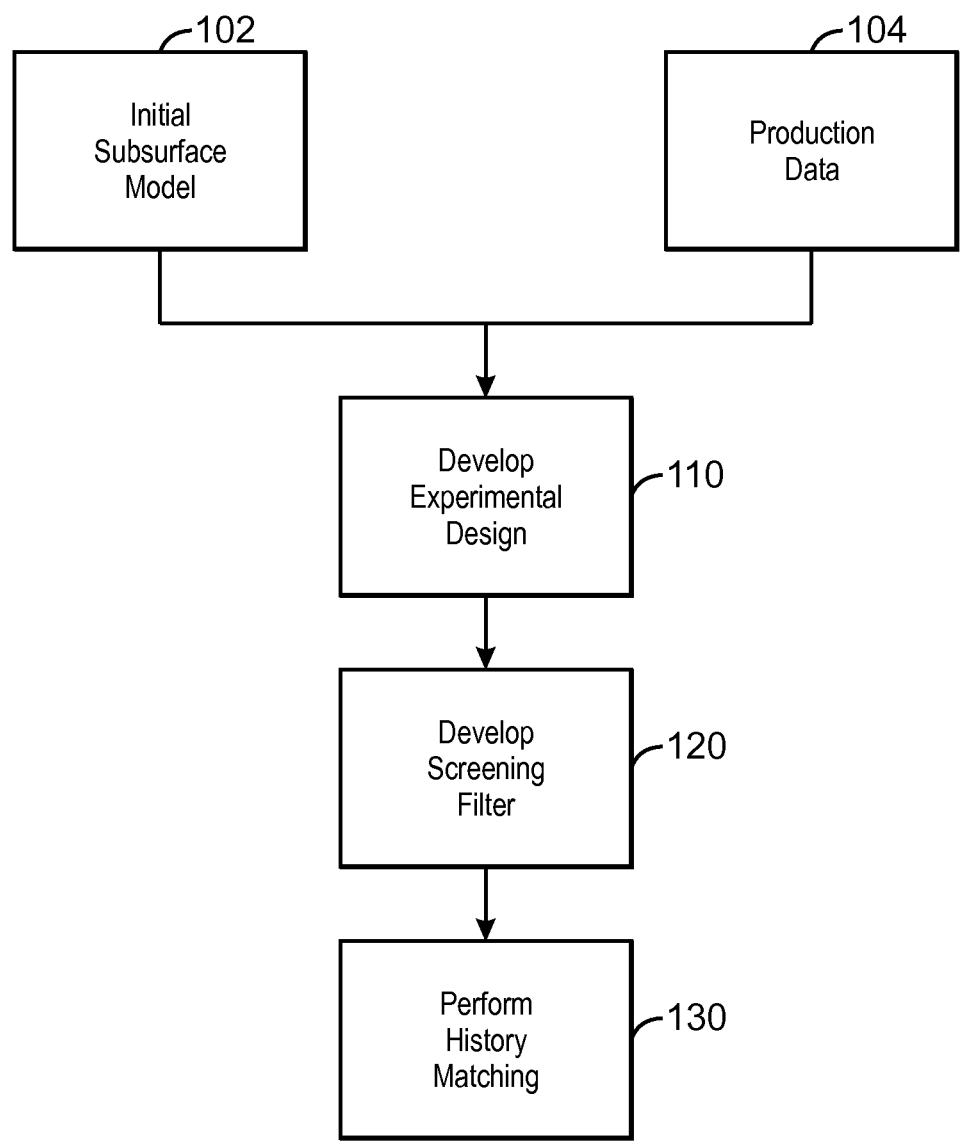
FIG. 1 is a block diagram of a method for using a screening filter to enhance the assisted history matching, in accordance with an exemplary embodiment of the present techniques.

In the following detailed description section, the specific embodiments of the present techniques are described in connection with preferred embodiments. However, to the extent that the following description is specific to a particular embodiment or a particular use of the present techniques, this is intended to be for exemplary purposes only and simply provides a description of the exemplary embodiments. Accordingly, the present techniques are not limited to the specific embodiments described below, but rather, such techniques include all alternatives, modifications, and equivalents falling within the true spirit and scope of the appended claims.

At the outset, and for ease of reference, certain terms used in this application and their meanings as used in this context are set forth. To the extent a term used herein is not defined below, it should be given the broadest definition persons in the pertinent art have given that term as reflected in at least one printed publication or issued patent. Further, the present techniques are not limited by the usage of the terms shown below, as all equivalents, synonyms, new developments, and terms or techniques that serve the same or a similar purpose are considered to be within the scope of the present claims.

"Adjoint model" or "adjoint method" refer to a mathematical evaluation of the sensitivity of a predictive model such as a reservoir simulator. Moreover, an adjoint model provides sensitivity data that represents the extent to which the output of a predictive model varies as its input varies. An adjoint model may comprise computing the gradient or sensitivity of the acceptance criteria with respect to model parameters by solving an auxiliary set of equations, known as adjoint equations. The adjoint method is an efficient method for computing sensitivities of large-scale conditioning tasks and, unlike most methods, the computational cost does not scale with the number of conditioning parameters. Many types of adjoint models are known in the art.

"Assisted history matching" (AHM) refers to the development and automation of at least a portion of workflows for history matching. In assisted history matching, optimization algorithms may be used to adjust appropriate parameters to improve the match. As used herein, assisted history matching attempts to make the process more systematic by using experimental design to better understand which parameters will influence the match, and by using optimization programs to more methodically vary those parameters that may improve the match.

"Coarsening" refers to reducing the number of cells in simulation models by making the cells larger. The process by which coarsening may be performed is referred to as "scale-up." Coarsening is used to lower the computational costs by decreasing the number of cells in a geologic or simulation model prior to generating or running simulation models.

"Common scale model" refers to a condition in which the scale of a geologic model is similar to the scale of a simulation model. In this case, coarsening of the geologic model is not performed prior to simulation.

"Computer-readable medium" or "tangible machine-readable medium" as used herein refers to any tangible storage that participates in providing instructions to a processor for execution. Such a medium may take many forms, including but not limited to, non-volatile media, and volatile media. Non-volatile media includes, for example, NVRAM, or magnetic or optical disks. Volatile media includes dynamic memory, such as main memory. Computer-readable media may include, for example, a floppy disk, a flexible disk, hard disk, magnetic tape, or any other magnetic medium, magneto-optical medium, a CD-ROM, any other optical medium, a RAM, a PROM, and EPROM, a FLASH-EPROM, a solid state medium like a holographic memory, a memory card, or any other memory chip or cartridge, or any other physical medium from which a computer can read. When the computer-readable media is configured as a database, it is to be understood that the database may be any type of database, such as relational, hierarchical, object-oriented, and/or the like. Accordingly, the invention is considered to include a tangible storage medium or tangible distribution medium and prior art-recognized equivalents and successor media, in which the software implementations of the present invention are stored.

"Connectivity" refers to a measure of fluid communication (or lack thereof) between points within a reservoir formation. Connectivity is closely related to the reservoir internal geometry and permeability distribution and is commonly a primary factor controlling hydrocarbon production efficiency and ultimate recovery.

"Communication" or "fluid communication" refers to the ability of either an injection fluid or indigenous hydrocarbons in a subterranean formation to flow between points or locations in the formation. When two locations are in "fluid communication," this means that fluid may flow when there is a potential differential between two locations. Fluid communication depends on the effective permeability of the region of the formation from which indigenous hydrocarbons are produced. Increased permeability results in increased communication.

"Depletion plan" or "production plan" is a plan for removing hydrocarbons from a reservoir, for example, through appropriate well placement and configuration, number of wells, injection of production enhancing fluids, and removal of fluids. Similarly a "depletion strategy" may also involve injecting fluids and removing fluids from a reservoir to produce hydrocarbons. Depletion plans and production strategies are designed to maximize profitability of hydrocarbon recovery.

"Direct search methods" refers to optimization techniques that use simply defined search algorithms to find improvements in the match near an initial guess without calculating derivatives. For example, a direct search method may involve calculating multiple values for a parameter at a first separation around the initial guess, identifying the parameter value associated with the best match, and then recalculating at a finer resolution in the vicinity of the value associated with the best match. This process may be repeated for a number of iterations, depending on the desired fit.

"Drainage volumes (DVs)" refer to volumes in the reservoir that are influenced by a given producing well, injector-producer pair, or set of injector-producer pairs. The drainage volume associated with a producer is the part of the reservoir where the pressure changes in response to production from that well. The drainage volume associated with an injector-producer pair is the volume swept by injected fluid as it flows from injector to producer. The drainage volume is characterized by its pore volume and location. The pore volume associated with the drainage volume can sometimes be inferred from breakthrough times (that is, how much fluid must be injected at a given injector before it appears at a given producer) or from pressure-transient analysis. Location of the drainage volume for a well or set of wells can be measured during production using time-lapse seismic data (that is, measuring the response to seismic as a function of time). Both location and volume can be determined directly in a simulation model by examining the changes in pressure and fluid composition during injection and production from the reservoir.

"Environments of deposition" (EOD) refers to the sum of physical conditions under which portions of a reservoir are formed. A reservoir is often sub-divided into different volumes to distinguish physical conditions that are believed to be present during formation of the reservoir that could lead to differences in reservoir property values (for example, porosity and permeability). EOD may be derived from seismic data to divide a reservoir framework into various geologic regions, such as channel axes and channel margins.

"Design of experiments" refers to techniques for identifying points for sampling variables or input parameters to be used in determining the response of a numerical or physical experiment. Results from conducting the experiments are used in constructing a surrogate modeling system, for example, generating a set of equations that represents the response of the simulator at particular points in an uncertainty space. Specific examples of experimental designs, as would be understood by one of skill in the art, include factorial designs, space-filling designs, full factorial, D-Optimal design, and Latin hypercube designs, among others.

As used herein, "displaying" includes a direct act that causes displaying, as well as any indirect act that facilitates displaying. Indirect acts include providing software to an end user, maintaining a website through which a user is enabled to affect a display, hyperlinking to such a website, or cooperating or partnering with an entity who performs such direct or indirect acts. Thus, a first party may operate alone or in cooperation with a third party vendor to enable the reference signal to be generated on a display device. The display device may include any device suitable for displaying the reference image, such as without limitation a CRT monitor, a LCD monitor, a plasma device, a flat panel device, virtual reality goggles, or a printer. The display device may include a device which has been calibrated through the use of any conventional software intended to be used in evaluating, correcting, and/or improving display results (for example, a color monitor that has been adjusted using monitor calibration software). Rather than (or in addition to) displaying the reference image on a display device, a method, consistent with the invention, may include providing a reference image to a subject. "Providing a reference image" may include creating or distributing the reference image to the subject by physical, telephonic, or electronic delivery, providing access over a network to the reference, or creating or distributing software to the subject configured to run on the subject's workstation or computer including the reference image. In one example, the providing of the reference image could involve enabling the subject to obtain the reference image in hard copy form via a printer. For example, information, software, and/or instructions could be transmitted (for example, electronically or physically via a data storage device or hard copy) and/or otherwise made available (for example, via a network) in order to facilitate the subject using a printer to print a hard copy form of reference image. In such an example, the printer may be a printer which has been calibrated through the use of any conventional software intended to be used in evaluating, correcting, and/or improving printing results (for example, a color printer that has been adjusted using color correction software).

"Exemplary" is used exclusively herein to mean "serving as an example, instance, or illustration." Any embodiment described herein as "exemplary" is not to be construed as preferred or advantageous over other embodiments.

"Fault" is a break in the earth layer and the adjacent horizon surfaces, across which there is observable displacement. A fault may either block the flow of hydrocarbons, creating a trap in which hydrocarbons may collect, or enhance the flow of hydrocarbons between regions in a reservoir.

"Fault transmissibility" refers to the flow rate of a 1 cp fluid across a fault for a pressure difference across the fault of 1 psi. Transmissibility is defined as permeability times the area available for flow divided by the distance over which a pressure difference is applied. Transmissibility times fluid mobility times pressure-difference gives volumetric flow rate.

"Flow equations" refer to equations representing conservation of mass, with Darcy's law defining volumetric flow rates. The simulator solves these equations to determine fluid composition as a function of time and location in the reservoir.

"Flow simulation" is defined as a computer-implemented numerical method of simulating the transport of mass (typically fluids, such as oil, water and gas), energy, and momentum through a physical system. The physical system may include a three dimensional reservoir model, fluid properties, and the number and locations of wells. Flow simulations also require a strategy (often called a well-management strategy) for controlling injection and production rates. These strategies are typically used to maintain reservoir pressure by replacing produced fluids with injected fluids (for example, water and/or gas). When a flow simulation correctly recreates a past reservoir performance, it is said to be "history matched," and a higher degree of confidence is placed in its ability to predict the future fluid behavior in the reservoir.

"Produced fluids" refer to liquids and/or gases removed from a subsurface formation, including, for example, an organic-rich rock formation. Produced fluids may include but are not limited to hydrocarbon fluids (such as crude oil condensate or light crude oil), hydrocarbon gases (such as methane, ethane, propane, etc.), and/or non-hydrocarbon fluids (such as carbon dioxide, hydrogen sulfide and water, including steam).

"Genetic algorithms" refer to a type of optimization algorithm that can be used for history matching. In this type of optimization algorithm, a population of input parameter sets is created, and each parameter set is used to calculate the objective function. In history matching, the objective function is calculated by running a flow simulation. A new population of parameter sets is created from the original population using a process analogous to natural selection. Members of the population that give a poor objective function value are eliminated, while parameter sets that give improvement in the objective function are kept, and combined in a manner similar to the way biological populations propagate. There are changes to parameter sets that are similar to inheritance, mutation, and recombination. This process of creating new populations continues until a match is obtained.

"Formation" means a subsurface region, regardless of size, comprising an aggregation of subsurface sedimentary, metamorphic and/or igneous matter, whether consolidated or unconsolidated, and other subsurface matter, whether in a solid, semi-solid, liquid and/or gaseous state, related to the geologic development of the subsurface region. A formation may contain numerous geologic strata of different ages, textures and mineralogic compositions. A formation can refer to a single set of related geologic strata of a specific rock type or to a whole set of geologic strata of different rock types that contribute to or are encountered in, for example, without limitation, (i) the creation, generation and/or entrapment of hydrocarbons or minerals and (ii) the execution of processes used to extract hydrocarbons or minerals from the subsurface.

"Global minimum" refers to a minimum value in the objective function across an entire parameter space for which an objective function is calculated.

"Gradient simulator method" refers to a method for calculating sensitivity coefficients during a reservoir simulation. Sensitivity coefficients are defined as the derivative of the simulator response with respect to each of input parameters. These derivatives are used in the optimization process to help guide the search for an improved match. Accordingly, if a derivative with respect to a given parameter is large, the response is sensitive to that parameter and, thus, varying that parameter could improve the objective function. A detailed description of the gradient simulator method is given in J. L. Landa, "Reservoir Parameter Estimation Constrained to Pressure Transients, Performance History, and Distributed Saturation Data", PhD Thesis, Stanford University Department of Petroleum Engineering, (June, 1997).

"Heterogeneity" refers to spatial variability in reservoir properties like permeability and porosity. This variability results from the process by which the sediment comprising the reservoir rock was deposited and subsequently modified by natural processes. Examples of heterogeneity are: shale barriers that often form between sand deposits in deepwater reservoirs, high permeability zones resulting from different kinds of sea life in different parts of a carbonate platform (i.e., platform rim vs. interior), or fractured zones that form as a result of faulting.

"Historical production data" refers to any data collected during production from the reservoir. Examples of production data are oil, water and/or gas flow rates from each well, log measurements of saturation, pressure measurements from permanent downhole gauges, wellhead pressure measurements, 4D (or time-lapse) seismic data, or the composition of produced water, gas or oil as a function of time for each wells.

"History matching" refers to the process of adjusting unknown parameters of a reservoir model until the predictions of the model resemble the past production of the reservoir as closely as possible. Generally, history matching may be performed by finding a minimum of an objective function that measures the misfit between field measurements and simulation results.

"Horizons" are characteristic surfaces located in a seismic image and corresponding to a lower surface ("base") and to an upper surface ("top") of sedimentary layers forming the subsoil zone studied. These horizons delimit geologic layers. Nonlimiting examples of horizons include unconformities, diastems, fault planes, rock-strata boundaries, depositional surfaces, and surfaces of intrusive or diapiric masses.

As used herein, "hydrocarbon management" includes hydrocarbon extraction, hydrocarbon production, hydrocarbon exploration, identifying potential hydrocarbon resources, identifying well locations, determining well injection and/or extraction rates, identifying reservoir connectivity, acquiring, disposing of and/or abandoning hydrocarbon resources, reviewing prior hydrocarbon management decisions, and any other hydrocarbon-related acts or activities.

"Injector-producer pair" refers to an injector and producer that are in fluid communication such that fluid injected at that injector will appear at the producer over the course of depleting the reservoir.

"Injectors" or "injection wells" are wells through which fluids are injected into a formation to enhance the production of hydrocarbons. The injected fluids may include, for example, water, steam, aqueous polymer solutions, and hydrocarbon gases, among others.

"Inter-unit transmissibility" refers to the flow rate between two geologic units for a 1 cp fluid that results from a 1 psi pressure difference. See the definition of transmissibility above.

"Kriging" is a group of geostatistical techniques used to interpolate the value of a random field at an unobserved location from observations of its value at nearby locations. From a geologic point of view, the practice of kriging is based on assuming continuity between measured values. Given an ordered set of measured grades, interpolation by kriging predicts concentrations at unobserved points.

"Local minima" refer to points in a function objective at which the functions trend upwards in all directions. However, local minima are not the lowest value for a function that may be found within a parameter space. See the definition for global minimum.

"Multi-dimensional scaling" (MDS) refers to a technique for visualizing differences in data. For example, a set of data indicating distances between any two data points may be reduced to a map of all of the data points indicating their relative locations in parameter space.

"Net-to-gross ratio (NTG)" refers to the ratio of volume occupied by porous rock through which fluid can flow to the total volume of rock. NTG=0.5 means that each cubic foot of rock contains 0.5 cubic feet of porous rock.

"Neural network" refers to a class of non-linear statistical data modeling tools. Given several sets of input parameters (from a reservoir simulation model in our example) and corresponding outputs (rates, pressures, fluid compositions, etc), a neural network allows prediction of outputs from the inputs without running any more simulations. As applied to AHM, neural networks are a specific kind of surrogate for the simulator.

"Objective function" refers to a mathematical function that indicates the degree of agreement or disagreement (mismatch) between results of running a tentative reservoir model and the field measurements. In matching simulation results with the production history, an objective function is commonly defined so as to attain a zero value for perfect agreement and a higher positive value for less precise agreement. An example of a commonly used objective function is the sum of the squares in the error (simulation minus observed) for a given production measurement (pressure phase rate, etc.). A low value of the objective function indicates good agreement between simulation results and field measurements. The goal in history matching is to obtain the lowest possible value of the objective function.

Mismatch can be defined between field historical production data (such as rates and flowing bottom hole pressures) and those obtained from the simulation runs. Mismatch can also be defined between 4D seismic data and corresponding measurements from the simulation model subsequent to flow simulation. An objective function can be developed for each measurement separately, or one can define a combination by using weighted averages of objective functions from different measurements. To make it part of the workflow, programs are developed to extract relevant results from the model and compute the mismatch with production data and save the resulting values of objective function.

"Oil-water contact (OWC) depth" refers to the depth at which oil becomes mobile. Below the OWC, only water is mobile.

"Optimization algorithms" refer to techniques for finding minimum or maximum values of an objective function in a parameter space. Although the techniques may be used with the intention of finding global minima or maxima, they may locate local minima or maxima instead of, or in addition to, the global minima or maxima. The techniques may use genetic algorithms, gradient algorithms, direct search algorithms, or stochastic optimization methods. These are described in the references on optimization at the beginning of the patent.

As used herein, the terms "optimal," "optimizing," "optimize," "optimality," and "optimization" (as well as derivatives and other forms of those terms and linguistically related words and phrases) are not intended to be limiting in the sense of requiring the present invention to find the best solution or to make the best decision. Although a mathematically optimal solution may in fact arrive at the best of all mathematically available possibilities, real-world embodiments of optimization routines, methods, models, and processes may work towards such a goal without ever actually achieving perfection. Accordingly, one of ordinary skill in the art having benefit of the present disclosure will appreciate that these terms, in the context of the scope of the present invention, are more general. The terms can describe working towards a solution which may be the best available solution, a preferred solution, or a solution that offers a specific benefit within a range of constraints. Furthermore, the terms may be used to describe continually improving, refining, searching for a high point or a maximum for an objective, or processing to reduce a penalty function, among others.

"Over screening" refers to narrowing an interval of interest too much, for example, eliminating models lying outside the interval of interest that might also give a satisfactory production history match.

"Parameter space" refers to a hypothetical space where a "location" is defined by the values of all optimizable parameters. As used herein, the parameter space may be described as a collection of all the history-matching parameters considered at any stage of history matching, along with the ranges of values that the parameters can be expected to take. The goal of history matching is to search the parameter space to find locations in the parameter space where the objective function is acceptably low.

"Parameter subspace" refers to a part of the initial parameter space, defined using either a subset of the total number of parameters or a smaller range of possible values for the parameters or some combination thereof.

"Pay zone" is an interval of rock in which an accumulation of oil or gas or other mineral is present in commercial quantities.

"Permeability" is the capacity of a rock to transmit fluids through the interconnected pore spaces of the rock. Permeability is defined by Darcy's Law: $Q=(k \Delta P A)/(\mu L)$, where $Q$=flow rate (cm3/s), $\Delta P$=pressure drop (atm) across a cylinder having a length L (cm) and a cross-sectional area A (cm2), $\mu$=fluid viscosity (cp), and k=permeability (Darcy). The customary unit of measurement for permeability is the millidarcy (i.e., 0.001 Darcy). "Permeability-thickness" refers to the product of the average permeability and the thickness of the formation. Permeability-thickness times the width available for flow divided by the length over which the pressure difference is applied gives transmissibility, defined earlier.

"Phase" refers to a chemically or physically uniform quantity of matter that can be separated mechanically from a non-homogenous mixture. It may consist of a single substance or a mixture of substances. The phases of matter are solid, liquid, gas, and plasma. Occasionally, "phase" may be used to describe other properties or states of matter, such as crystalline, colloidal, glass, and amorphous. In hydrocarbon production, aqueous (water), liquid (oil), and vapor (gas) phases are present.

"Phase rates" refers to the rate at which a particular phase is produced from or injected into the reservoir.

"Porosity" is defined as the ratio of the volume of pore space to the total bulk volume of the material. This ratio may be expressed in terms of a percentage. Porosity is a measure of the reservoir rock's storage capacity for fluids. Porosity is preferably determined from cores, sonic logs, density logs, neutron logs or resistivity logs. Total or absolute porosity includes all the pore spaces, whereas effective porosity includes only the interconnected pores and corresponds to the pore volume available for depletion.

"Pore volume" (PV) is defined as the volume of fluid associated with a portion of a reservoir. It is the product of average porosity and the volume of the portion of the reservoir in question.

"Process-based model" or "physics-based model" refers to a predictive model that receives initial data and predicts the behavior of a complex physical system such as a geologic system based on the interaction of known scientific principles on physical objects represented by the initial data.

"Producers" or "production wells" are wells through which production fluids are removed from a reservoir.

"Production Data" refers to any values that may be measured over the life of the field. Examples include rates of production of oil, gas, and water from individual production wells, pressure measured vs. depth for specified wells at specified times, pressure at a specified depth measured in a specified well vs. time, seismic response measured at a specified time over a specified area, fluid compositions vs. time in specified wells, flow rate vs. depth for a specified well at specified times. The model should be consistent with all available production data to improve the chances that predictions of future field behavior will be correct.

"Production rates" refer to rates at which fluids are produced from individual wells, collections of wells, or the entire field. Rates at which liquids are produced are given in barrels per day or cubic meters per day at the conditions present in surface production facilities. Gas rates are given in standard cubic feet per day.

"PV of flow units or fault blocks" refers to the pore volume in a flow unit or fault block. A flow unit is usually a geologic zone in the reservoir. Zones are designated by their geologic origin and their properties.

"Reservoir" or "reservoir formations" are typically pay zones (for example, hydrocarbon producing zones) that include sandstone, limestone, chalk, coal and some types of shale. Pay zones can vary in thickness from less than one foot (0.3048 m) to hundreds of feet (hundreds of m). The permeability of the reservoir formation provides the potential for production.

"Reservoir properties" and "reservoir property values" are defined as quantities representing physical attributes of rocks containing reservoir fluids. The term "reservoir properties" as used in this application includes both measurable and descriptive attributes.

Examples of measurable reservoir property values include rock-type fraction (for example, net-to-gross, v-shale, or facies proportion), porosity, permeability, water saturation, acoustic impedance, and fracture density. Examples of descriptive reservoir property values include facies, lithology (for example, sandstone or carbonate), and environment-of-deposition (EOD). Reservoir properties may be populated into a reservoir framework to generate a reservoir model.

"Geologic model" is a computer-based representation of a subsurface earth volume, such as a hydrocarbon reservoir or a depositional basin. Geologic models may take on many different forms. Depending on the context, descriptive or static geologic models built for petroleum applications can be in the form of a 3-D array of cells, to which reservoir properties are assigned. Many geologic models are constrained by stratigraphic or structural surfaces (for example, flooding surfaces, sequence interfaces, fluid contacts, faults) and boundaries (for example, facies changes). These surfaces and boundaries define regions within the model that possibly have different reservoir properties.

"Reservoir simulation model" or "simulation model" refer to a mathematical representation of a hydrocarbon reservoir, and the fluids, wells and facilities associated with it. A reservoir simulation model may be considered to be a special case of a geologic model. Simulation models are used to conduct numerical experiments regarding future performance of the hydrocarbon reservoir to determine the most profitable operating strategy. An engineer managing a hydrocarbon reservoir may create many different simulation models, possibly with varying degrees of complexity, to quantify the past performance of the reservoir and predict its future performance.

"Saturation" of a phase (oil, gas or water) is defined as the fractional volume of pore space occupied by that phase.

"Scale-up" refers to a process by which a high resolution grid is coalesced to form a coarser grid populated with corresponding coarse property distributions. The process involves creating a coarse grid, followed by computing and assigning properties; for example, by averaging the property within a certain range. Scaling-up a high resolution model typically lowers the computational costs of running numerical flow simulation.

"Seismic" or "seismic data" may include or represent seismic events (or for example, signals) that reflect and/or diffract at discontinuous objects and/or continuous horizons. Continuous horizons may include, for example, interfaces between geologic layers. Discontinuous objects may include, for example, small scale diffractors, faults, or small scale fractures.

"Shortest path algorithm" (SPA) refers to a modeling approach in which a reservoir is modeled as a graph having a collection of vertices (which correspond to gridblocks), connected by edges (which correspond to the faces between gridblocks). A cost may be defined as a measure of the ease of movement along any edge. A path is a collection of edges that connect one vertex to another. For example, one convenient measurement of cost for an edge is the inverse of transmissibility across the corresponding gridblock face. High transmissibility corresponds to low cost. Another useful measure of cost is transit-time, which is proportional to pore volume (PV) divided by transmissibility. Given a definition of cost, SPA's may be used to efficiently find the lowest-cost path between any two vertices. As an example of how SPA's are used, the pore volume associated with a given path can be found by summing the PV of all the gridblocks along that path. To define a connected pore volume between two wells, the shortest 'path'—consisting of a series of gridblocks through the reservoir that connect the injector and a producer—is measured. A group of such 'short paths' may be bundled, and the total pore volume corresponding to this bundle may be added. This constitutes a static measurement of drainage volume (DV) between this set of wells.

"Shortest path cost" refers to the cost of the shortest path identified using a shortest path algorithm. It corresponds to the sum of the values for the individual edges between vertices.

"Simulated annealing" is an optimization process by which input parameter values are randomly perturbed until an objective function calculated for the model reaches an acceptable value. In history matching, the objective function will measure the difference between historical production data and simulation predictions, and the goal will be to find the lowest possible value for the objective function. Perturbations that improve the match are accepted into the model, although some perturbations that degrade the match are also accepted to avoid local minima.

"Splines" (as in "spline fitting") refer to a wide class of functions that are used in applications requiring data interpolation and/or smoothing. In the process of spline fitting, the spline, which is a special type of piecewise polynomial, is used to interpolate across data points. Spline functions for interpolation are normally selected to minimize suitable measures of roughness (for example integral squared curvature) subject to the interpolation constraints. Splines can be linear, quadratic or cubic etc., depending on the degree of the piecewise polynomial.

"Static measurements" are property measurements that are either taken at a single time or do not change over time. In general, static measurements of a reservoir may include structure components, reservoir architecture components, rock type components, and petrophysics components. Structure components include, for example, geometric form and closure, depth, fault style and timing, dips, and compartmentalization. Reservoir architecture components may include depositional system, depositional environment, net-to-gross ratio, vertical heterogeneity, and interval thicknesses, among others. Rock type components relate to lithological components and pay distributions. Petrophysics components may include fluid type, contacts, lateral permeability heterogeneity, vertical-to-horizontal permeability ratios, and diagenetic and mineralogical issues, among others. Static measurements on a reservoir model refer to computing quantities such as connected pore volume between wells as some function of existing properties such as porosity and permeability.

"Static reservoir engineering analyses" refers to analyses based on a simplified representation of the physics of a flow process. Examples of static reservoir engineering analyses include the use of shortest-path algorithms to define drainage volumes around producers or between injectors and producers, permeability-thickness around wells, PV of flow units or fault blocks, and shortest-path costs between injectors and producers. These analyses give information such as preferred flow paths, resistance to flow, and volumes of compartments in the reservoir.

"Stochastic optimization techniques" refer to optimization methods in which parameters are varied randomly to search for an optimal result (a low objective function). Simulated annealing is an example of a stochastic optimization technique.

"Streamline-based method" refers to a method for calculating sensitivity coefficients in reservoir simulations by tracing along streamlines and estimating the impact of changes in permeability and/or porosity on the flow rate and/or pressure gradient along that streamline. These sensitivity coefficients are then used in gradient optimization methods to reduce the objective function.

"Transmissibility" refers to the volumetric flow rate between two points at unit viscosity for a given pressure-drop. Transmissibility is a useful measure of connectivity. Transmissibility between any two compartments in a reservoir (fault blocks or geologic zones), or between a well and a reservoir (or particular geologic zones), or between injectors and producers, can all be useful for understanding connectivity in the reservoir.

"Water breakthrough time" is a measurement of the time from which water injection at an injection well commences until the injected water is produced from a production well.

"Well" or "wellbore" includes cased, cased and cemented, or open-hole wellbores, and may be any type of well, including, but not limited to, a producing well, an exploratory well, and the like. Wellbores may be vertical, horizontal, any angle between vertical and horizontal, diverted or non-diverted, and combinations thereof, for example a vertical well with a non-vertical component.

"Well logs" and "well log data" are data obtained from analyzing wireline logs and core samples collected from drilled wells. The data may represent physical properties of geologic layers, such as porosity and permeability, among others.

"Workflow" refers to a series of steps carried out in order to systematically conduct a reservoir engineering study. At the highest level, a workflow would consist of deciding what parameters are uncertain, and then varying them to determine which of those parameters change reservoir performance. Based on this, more detailed studies could be carried out to decide how to best produce the reservoir and part of this overall workflow is history matching. At a more detailed level, simulation workflows are defined to allow systematic analysis of simulation results in a history matching study. A typical workflow used in history matching might involve copying a base case model, making some change to that model (adjusting porosity or permeability, for example), running the simulation, and calculating objective function values from the results of the simulation.

Exemplary embodiments of the present techniques disclose methods and systems for assisted history matching. The present techniques integrate static reservoir engineering analyses with the history matching process. The static reservoir engineering analyses are based on a simplified representation of the physics of the flow process. For example, shortest-path algorithms may be used to define drainage volumes around producers or between injectors and producers, permeability-thickness around wells, pore volume of flow units or fault blocks, and shortest-path costs between injectors and producers. These analyses may provide information such as preferred flow paths, resistance to flow, and volumes of compartments in the reservoir. Accordingly, the results of the static reservoir engineering analyses can provide a physics-based surrogate for the simulation.

However, the surrogate does not replace the simulator completely because it does not solve the dynamic pressure equations dictated by conservation of mass and Darcy's law. In exemplary embodiments of the present techniques, the results from the static reservoir engineering analyses may be used to help speed up a history match process by providing a screening technique or filter that lowers the computational costs by decreasing a number of flow simulations that may need to be run. The screening filter is generally derived from an objective function that measures a similarity between simulation results and the production history. Then, a relationship is developed between the objective function and the static measurement. The static measurements are used to provide an estimate of the objective function for future models. That is, simulations of parameter sets in a simulation model near a global minimum in the objective function are more likely to provide valuable simulation results than runs further from the global minimum. As such, the simulation models with sets of parameters not satisfying a screening filter should not involve performing a simulation, as they are unlikely to provide simulation results that reduce the objective function.

FIG. 1 is a block diagram 100 of a method for using a screening filter to enhance the assisted history matching, in accordance with an exemplary embodiment of the present techniques. To begin, an initial subsurface or reservoir model, as shown in block 102, and production data, as shown in block 104, may be used to develop an experimental design, as shown in block 110. Creating this design may include determining which model parameters can be adjusted, while still maintaining consistency with available geologic data and concepts. The experimental design may include an initial simulation model or set of models that are consistent with available geologic data and interpretations. Further, the development of the experimental design may include determining model parameters (for example, a subset of model parameters used in the simulation) and their associated ranges. Selection of this list of model parameters may involve engineering and geoscience judgment as to which parameters have higher uncertainty. Based on this selection, a list of simulations to run (termed "scenarios") can be determined to efficiently explore the parameter space of interest. This list is called the experimental design. The parameter space is defined as the parameters that may be modified to enhance the history match, and the range of values over which each parameter can be varied. The experimental design may then be used to perform one or more simulations that provide results for the different parameters (for example, experiments or scenarios).

As a geologic model may often be too finely gridded for simulation, in an exemplary embodiment the model may be scaled-up to create a coarser model (for example, a simulation model having model parameters) that can be used for simulation. In other embodiments, a "common scale model" may be constructed, in which the geologic model is similar in resolution to the simulation model. The use of a common scale model allows more rapid iteration on the geologic description by making the geologic model smaller, thus speeding up the process of creating a new geologic model and scaling up to generate a simulation model from each new geologic model. Some modifications are best made in the geologic model. For example, changes like top structure or fault locations should preferably be made in the geologic model, with an extra step added to the workflow to develop the simulation model from this new geologic model. However, it is often faster to make modifications in the simulation model directly without constructing a new geologic model.

Based on experience, uncertainty of geologic concepts, and analysis of production data, a range of uncertainty may be assigned to each model parameter to form a list or set of history matching parameters. For example, a certain field may only have measurements that put an oil water contact (OWC) depth between the values of A (ft) and B (ft). In this case, if other errors in the measurement are ignored, the uncertainty range for OWC depth is [A, B]. To explore the impact of this uncertainty, cases that have an OWC depth=A ft, B ft and (A+B)/2 ft could be run.

Experimental design methods can be used to determine a list of simulations to run (which may be termed "scenarios") to efficiently explore the parameter space of interest. For example, a full factorial or a D-Optimal design may allow the exploration of the full limits of uncertainty space, while a Latin Hypercube Design may allow one to uniformly sample the uncertainty space. Further, more limited designs, such as main effects designs, could be used to identify the controlling parameters for the assisted history matching without running a large number of simulations.

If the initial set of simulation models was developed using an experimental design, the objective function may serve as a response for analyzing the simulation model sensitivities. The results of this analysis may yield a ranking of history matching parameters and the relationships that impact each response separately. This information can be used to eliminate parameters initially included for which the uncertainty has little impact on the match results. Further, the results of the analysis may also identify the strongest factors that control each aspect of the reservoir flow, for example, the factors that impact pressure at the injector and the parameters that impact the water breakthrough time at the producer (which may be the same). If the identified factors are different for different responses, a parameter may be independently selected to match the corresponding aspect of the flow in the reservoir.

Although experimental design analysis may be used in exemplary embodiments, other embodiments may use different techniques to study the relationships between history match parameters, static connectivity measurements, and objective function, such as using statistical tools including regression on cross-plots and other methods for measuring differences between models (such as multi-dimensional scaling (MDS)). Exemplary embodiments of the present techniques may use these alternate analyses to perform history matching by rate mismatch or breakthrough time mismatch vs. drainage volume between wells, early-time pressure at injectors vs. permeability-thickness, pressure decline vs. fault block pore volume or fault seal, etc. In these techniques, mismatch (which corresponds to objective function for experimental designs) may be defined as the sum of differences (or squares of differences) between field measurements and simulation results.

At block 120 the simulation results can be analyzed to determine if a relationship is indicated between a geologic connectivity measurement and an objective function. That is, for each scenario, the results of the simulations are analyzed to determine which static geologic or reservoir engineering measurements can be used to predict the value of an objective function. Then, ranges of static measurements that give desirable values of an objective function are found. Certain of these geologic measurements and ranges may then be selected to be the screening filter for the history matching process.

Then, at block 130, the history matching process may be performed with the screening filter. In exemplary embodiments, an optimization program is then used to control the history matching process or workflow. The optimization program generates modified simulation model parameters that may be used to enhance the match, as discussed further below. In an exemplary embodiment of the present techniques, static reservoir engineering analyses (i.e., physics-based analysis of the simulation model) performed in tandem with the simulation models are used to screen the simulation models. The physics-based measurements are computationally inexpensive and may provide useful information about the simulation models that make up the design. Simulation results are generally dependent on the connectivity qualities of the simulation model. For example, water breakthrough time at a producer can be expected to be related to the pore volume in the dominant flow paths connecting the producer to an injector. Initial simulation results may be used to develop correlations between objective function and physics-based analyses made on the models in the design (discussed further with respect to FIG. 2b). The correlations can then be used to screen simulation models, for example, on the basis of connectivity measurements, to identify simulation models that may provide a good history match (i.e., a low value of the objective function).

Further, the amount of data available concerning the expected flow mechanisms is limited, and thus the history match problem is under-constrained. Therefore, it is possible to arrive at several different solutions that each satisfy the available data. To be able to capture the range of prediction results possible given these constraints, a strategy is to find simulation models that give a satisfactory match to the production data while being as different as possible from each other. For example, the differences between simulation models may be representative of the location of fluid movement, rock and fluid properties, among others, that lie within the range of uncertainty for each parameter.

Figure 2A:
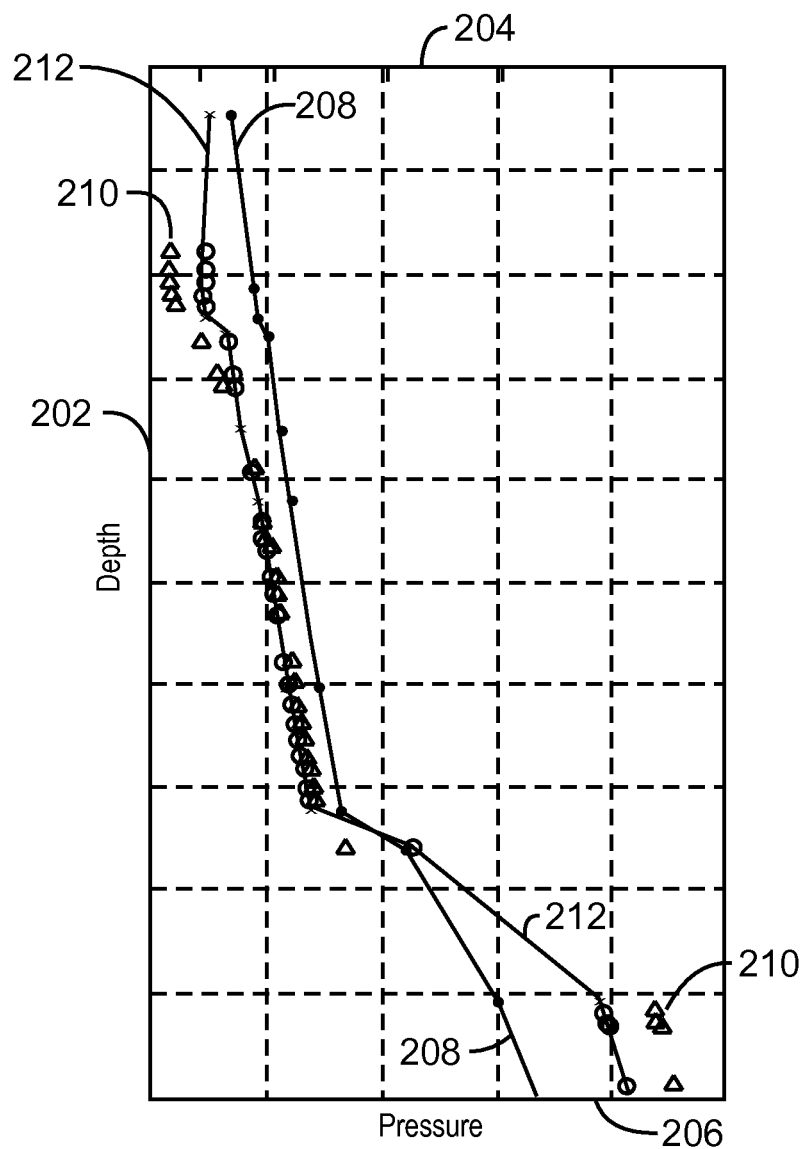
FIG. 2A is a graph of a pressure vs. depth simulation, showing the improvement that may be obtained from history matching, in accordance with embodiments of the present techniques.

FIG. 2A is a graph 200 of a pressure vs. depth simulation, showing an improvement that may be obtained from assisted history matching (AHM), in accordance with embodiments of the present techniques. In FIG. 2A, the y-axis 202 represents the depth in the subsurface formation, with the top 204 of the graph 200 generally closer to the surface. The x-axis 206 represents the pressure in the well, with the pressure increasing from left to right. As can be seen from the graph 200, the initial result 208 for pressure vs. depth, as generated by a simulation does not closely match the actual measured data 210 (as indicated by the triangles).

To improve this match, several model parameters may be adjusted, for example, by using the techniques for assisted history matching (AHM) described herein. The model parameters may include such parameters as fault transmissibility, net-to-gross, and horizontal permeability. After the history match, the adjusted model gave simulation results 212 that are much closer to the production data. The simulation model that was adjusted simulation results 212 may then be used for predictions of production, well depletion plans, and the like.

Part of AHM, or any history match, is selecting what portions of the simulation model should be modified to improve the history match. For example, each of the cells of the simulation model with values for porosity and permeability in a certain range may be selected for changes in permeability or porosity. However, the techniques described here are not specific to any single method for selecting cells to be modified or conducting the actual modifications.

The history match problem may be formulated as an optimization problem by defining a quantitative measurement of the mismatch between the production history and a flow simulation. By performing a simulation run, results, which include pressures, rates, and saturations, are generated that can be compared to measurements from the field during production. An objective function is a measure of how much the simulation results differ from the field measurement (for example, production data). The objective function may be calculated as the normalized sum (over time) of errors in rate, pressure, or any other state variable predicted by the static measurements or the flow simulations. Thus, history matching is the process of adjusting the model parameters to obtain the lowest possible value of the objective function. To conduct the history match, the model parameters which can be varied to achieve a history match are identified. This is generally performed using geoscience and engineering judgment to select the parameters, while considering the potential errors in the available measurements (like seismic, rates, well logs, etc).

Figure 2B:
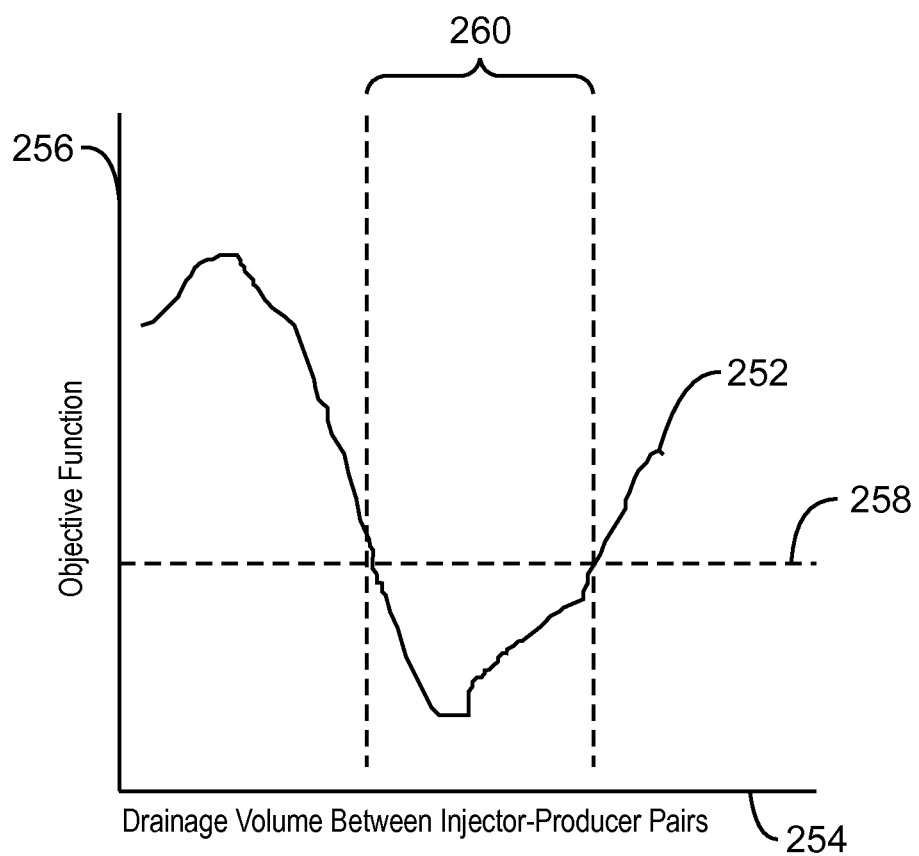
FIG. 2B is a graph of an objective function vs. drainage volume (which is an example of a static geologic measurement), in accordance with an embodiment of the present techniques.

FIG. 2B is a graph 250 of an objective function 252 calculated from simulation results, in accordance with an embodiment of the present techniques. In this graph 250, the x-axis 254 represents a relative measure of the drainage volume between an injector-producer pair, while the y-axis 256 represents the mismatch between the production history and the simulation results, i.e., the objective function. The drainage volume between wells is an example of a static geologic measurement made on the simulation model. In the graph 250, a threshold 258 for a maximum objective function value that gives an acceptable match has been selected. This threshold 258 may be selected on the basis of the number of measurements involved, the accuracy desired for the results of the measurements, or any number of other factors. The threshold 258 and the correlation may be used to define an interval of interest 260.

The interval of interest 260 defines a region of values for a parameter (such as drainage volume in this example) that may be used for more detailed studies of the reservoir properties. In an exemplary embodiment of the present techniques, static reservoir engineering analysis is used to screen models without actually running flow simulations. Based on the drainage volume computed from the static measurements, it can be determined if a particular simulation model lies within the interval of interest 260. When a simulation model within an interval of interest is identified, a flow simulation may be performed for that simulation model. Accordingly, performing flow simulations can be bypassed for drainage volumes that lie outside of the interval of interest 260.

The techniques discussed above may be used in an initial broad scoping study to identify a parameter subset and a starting simulation model that is more likely to contain the solution. Once a likely region for a solution is identified, optimization tools may be used to adjust the starting simulation model to obtain an improved match with production data. Generally, fewer iterations are needed if derivatives of the objective function with respect to history match parameters (for example, specific subset of the model parameters) are used to make the adjustments. As would be understood by one of ordinary skill in the art, there are a number of methods for calculating derivatives that may be used in exemplary embodiments, including a gradient simulator method, an adjoint method, and a streamline-based method.

The first two algorithms involve solving equations similar to the flow equations. Thus, there may be a memory and CPU time penalty for the calculation of derivatives. Furthermore, as gradient methods may often track along a maximum decrease in the slope of the response surface, gradient based methods may stop at local minima, rather than the global minimum or best solution.

Other methods have been developed that make these adjustments without calculating derivatives. For example, stochastic optimization techniques such as genetic algorithms or simulated annealing generate and test many guesses for the final solution and use those guesses that improve the match to define other possible solutions. Another general class of methods is referred to as direct search methods. These methods use simply defined search algorithms to find improvements in the match, for example, by mapping the objective function near an initial input guess without calculating derivatives. Any of the optimization techniques discussed above may be used in exemplary embodiments of the present techniques.

Figure 3:
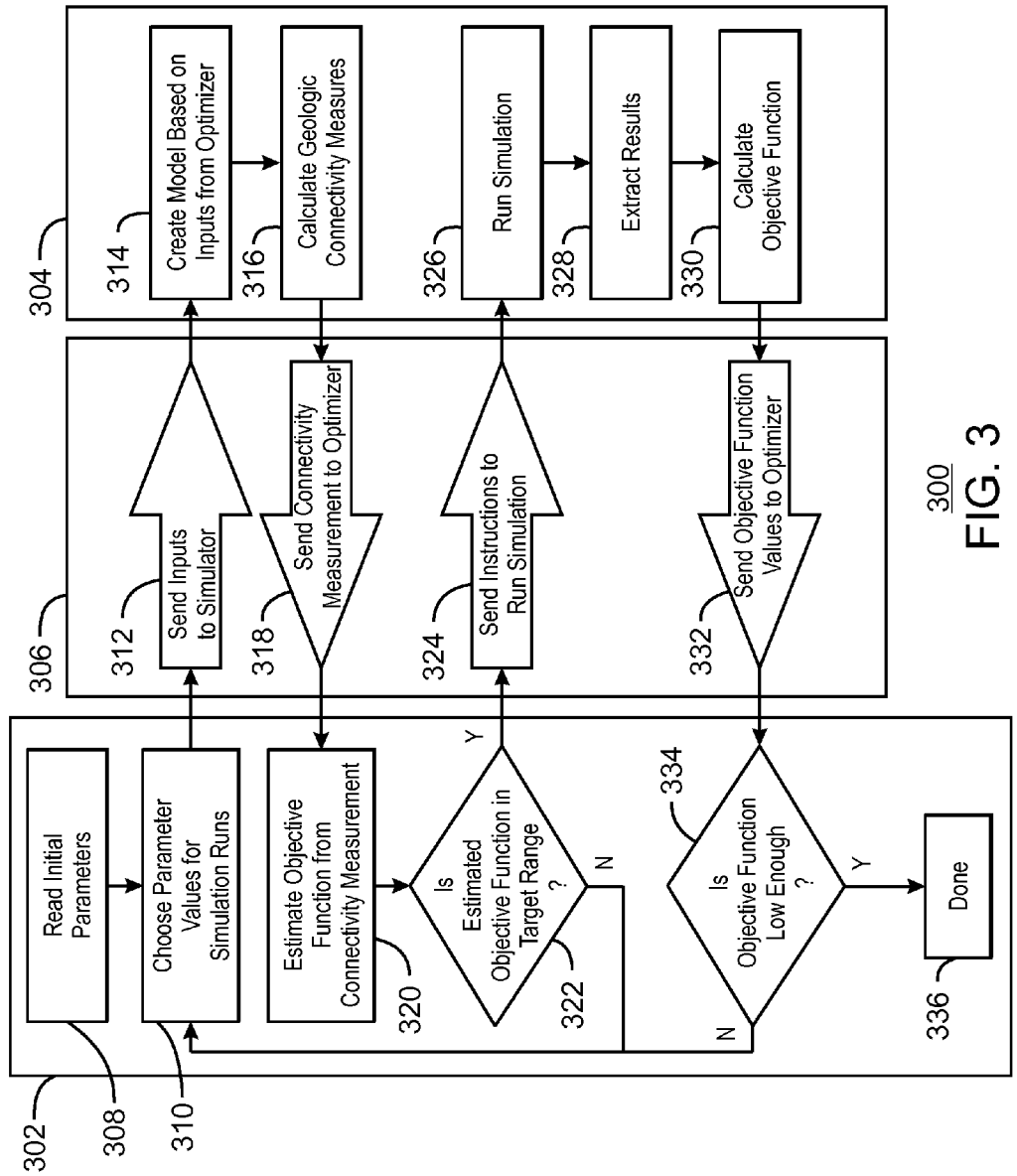
FIG. 3 is a block diagram of a method for history matching, in accordance with an embodiment of the present techniques.

FIG. 3 is a block diagram 300 of method for history matching, in accordance with an exemplary embodiment of the present techniques. Each of the blocks in the method may represent hardware elements, software elements, or a combination of hardware and software. Further, the arrangement of the elements is merely one example of how the functionality may be achieved. The elements may be arranged in different conformations without changing the function or scope of the method. The elements may be implemented on any number of processing systems, for example, as described with respect to FIG. 16, below. In this exemplary embodiment, an optimizer 302 interacts with a flow simulator 304 via an interface 306 to enhance history matching process. As shown in the diagram 300, the optimizer 302 can obtain model parameters, as shown in block 308. These model parameters may be read from a memory location (not shown) or may be entered by a user via an input device (not shown). Then, the optimizer 302 selects the model parameters for the simulation in the flow simulator 304, as indicated in block 310. The optimizer 302 provides the selected parameters to the flow simulator 304 via the interface 306, which may include transmitting the selected parameters or indicating a location in memory or other machine-readable medium where the selected parameters are stored, as indicated by block 312.

The flow simulator 304 can perform one or more calculations based on these selected parameters. In particular, the flow simulator 304 can use the selected parameters as part of a simulation model to create a simulation run, as shown block 314. At block 316, the simulator 304 calculates static geologic connectivity measurements based on the simulation model. These static geologic connectivity measurements are then provided to the optimizer 302, as indicated by block 318.

As an example, a net-to-gross ratio (NTG) by rock-type may be selected as a history-match parameter. The procedure may read a new NTG value for each rock type from input files, look up porosity and permeability values in a table and populate the simulation model with these new properties according to rock-type. Another history match parameter may include transmissibility across faults. Adjustment of transmissibility across faults may be made based on another input file. These modifications can be made to the geologic model, the simulation model, or both. These parameters are modified by the flow simulator 304.

If more than one simulation model is developed, techniques may be used to determine whether they produce via different flow paths. Such techniques include comparing saturations, streamlines for different models, or results of SPA. Further, simulation models that duplicate mechanisms seen in earlier simulation models may be eliminated unless the objective function is significantly improved. This may be useful in the effort to obtain multiple history matched simulation models that are measurably different from each other.

In exemplary embodiments of the present techniques, making static measurements is defined as any method short of full physics flow simulation that can be used to measure connectivity in a geologic or simulation model. For example, transmissibility is a useful measure of connectivity. Another measure of connectivity that can be useful is the pore volume (PV) available for depletion. Measurements of this include the PV for geologically defined compartments, and the PV accessible to certain wells, or well pairs. Shortest path algorithms (SPA) can be used in exemplary embodiments to combine measures of transmissibility and PV.

In exemplary embodiments of the present techniques, any of these methods, or other techniques that may be used to measure connectivity or other physical characteristics of the simulation model, may be used to make measurements on the static geologic model. Using these measurements, features in the simulation model that may relate to dynamic flow responses such as breakthrough time or flowing bottomhole pressure, etc., may be identified. Programs that may make the static measurements on the simulation model automatically are included in the screening step, which is part of the optimization.

With the static geologic connectivity measurements, the optimizer 302 performs a screening of the simulation model before performing the simulation. In particular at block 320, the optimizer 302 uses the static geologic connectivity measurement to estimate a value of the objective function. This estimate is found using a relationship determined prior to the model adjustment part of the assisted history matching process, as shown in block 322. Then, the estimated value of the objective function is compared to the screening filter to determine whether a simulation should be performed. For instance, if the estimated value of the objective function is not within a target range, then workflow in the optimizer 302 returns to block 310 in order to select a different set of model parameters for the simulation model in the flow simulator 304. However, if the estimated value of the objective function is within a target range, then the optimizer 302 provides an indication to the flow simulator 304 to perform one or more simulations with the set of model parameters, as indicated by block 324.

With the indication to perform the simulation, the simulator 304 performs a simulation run, as indicated in block 326. The results from the simulation are generated in block 328. With the results, the simulator 304 calculates values of the objective function, as shown in block 330. Note that extracting results and calculating objective function need not be done in the simulator. The interface could be used to extract results and the objective function could be calculated in the interface or the optimizer. The simulator 304 then provides the calculated values of the objective function to the optimizer 302 via the interface 306, as indicated by block 332.

With the calculated value of the objective function from the simulator 304, the optimizer 302 determines whether the match is acceptable. At block 334, the optimizer 302 determines whether the values of the objective function are low enough. If calculated values are not low enough, then the optimizer 302 selects different parameters for the simulation model in the flow simulator 304, as shown in block 310. However, if the calculated values of the objective function are low enough, then the optimizer 302 provides an indication that the process is complete, as indicated at block 336.

The optimizer determines if changes in the objective function are no longer significant in comparison to a target value. This indicates that the optimization may have converged to a result indicating that the simulation may be accurate, for example, within 10%, 5%, 1%, or less of the production history. The desired accuracy may be determined by a user prior to running the simulation, for example, by selecting a target minimum value for objective function changes. If sufficient convergence has been achieved, the optimizer can provide an output to a user. If sufficient convergence has not been achieved a new parameter file may be written.

In the techniques discussed above, various issues may arise, especially in more complicated scenarios. For example, if no correlation is found to exist between any objective function measure and the static measure of connectivity, the algorithm reduces to a simple optimization, which may provide an insight into the complexity of the response space.

Figure 4:
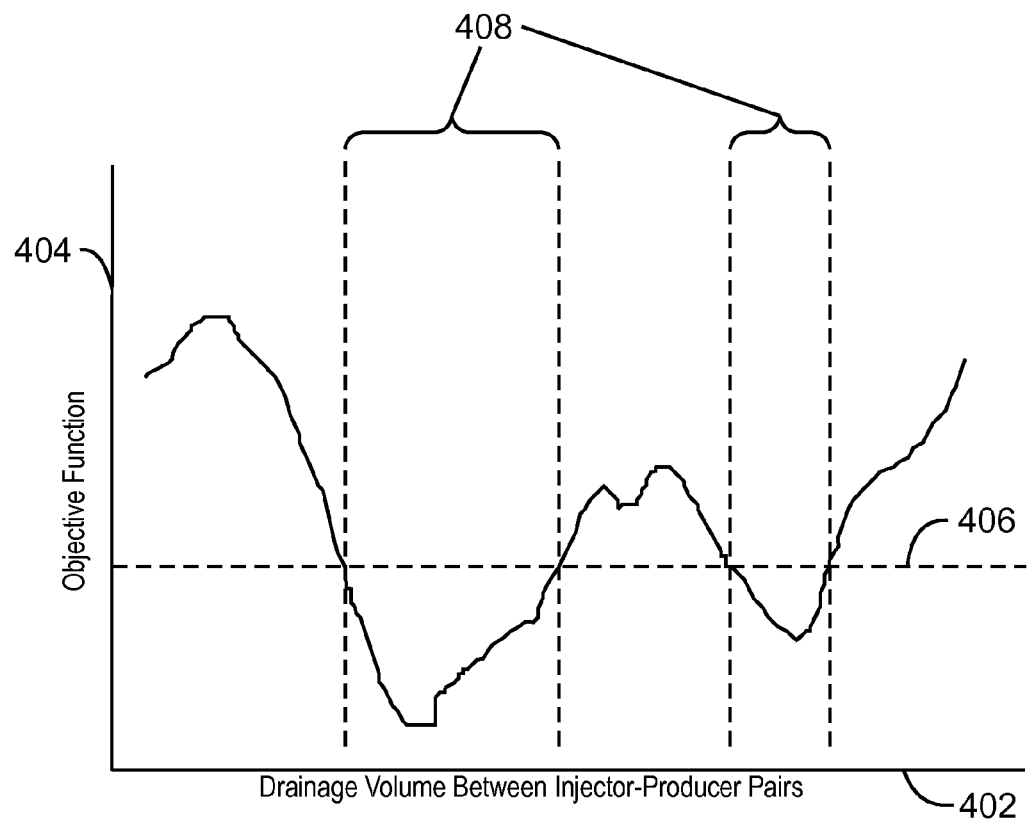
FIG. 4 is a graph of objective function vs. drainage volume for a complex parameter space, in accordance with an embodiment of the present techniques.

The techniques described above are not limited to simple scenarios, such as single minima or single injector-producer pairs. FIG. 4 is a graph 400 of a more complex parameter space. In FIG. 4, the x-axis 402 represents a relative measure of drainage volume between an injector-producer pair, while the y-axis 404 represents an objective function between a production history value and a simulated result. As illustrated in the graph 400, it is possible to have multiple minima that project below a target threshold value 406. Thus, more than one interval of interest 408 may be identified in this case. Accordingly, a model may be evaluated to determine if it lies within either of the intervals before running the full scale flow simulation.

Figure 5:
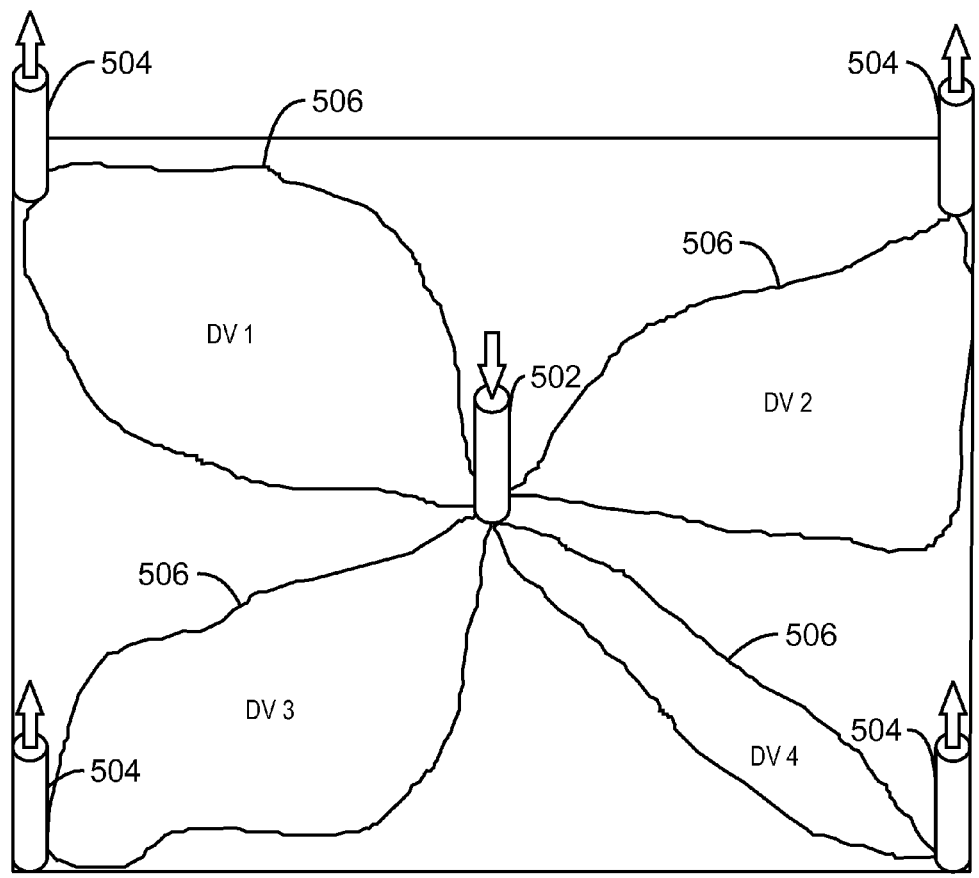
FIG. 5 is a diagram of a reservoir illustrating the use of multiple producer wells with a single injector well, in accordance with an embodiment of the present techniques.

FIG. 5 is a diagram 500 of a reservoir illustrating the use of multiple producer wells with a single injector well, in accordance with an embodiment of the present techniques. This scenario is much more likely in field environments than a single injector-producer pair. The diagram 500 illustrates a 5 spot pattern, which is characterized by a single injector 502 and four producers 504. This defines four separate drainage volumes (DVs) 506, one for each injector-producer pair. Simulation results such as water breakthrough time at each producer can be cross-plotted against the DV 506 corresponding to that injector-producer pair and used in the assisted history matching procedures described with respect to FIGS. 1 and 3. If an experimental design (for example, an experimental model) has been used to generate data, different parameters may be varied to improve the match in each well separately, focusing only on the area of interest for that well. If the experimental design analysis indicates that there is an overlap between the certain controlling parameters for matching each well, the cross plots for each of the injector-producer pairs may be used at the same time, running simulation on the simulation models that satisfy the criteria. Further, more complex historical data, including multiple injection and production wells, may be matched.

In any screening process that is based on numerical experiments (for example, the simulation runs discussed herein), there is a possibility of over-screening, that is, the existence of simulation models outside of the interval of interest, as defined by the initial scoping study, that may also give a satisfactory production history match. In exemplary embodiments of the present invention, the screening process may be strengthened by configuring the simulator to test one simulation model for every n models that the screening tools discards. For example, every 21st model that is ruled out by the screening criterion may be simulated, thus controlling a potential for over-screening. If it is found that the simulation model provides a satisfactory match to production data, but does not satisfy the current screening constraint, the screening constraint may be updated to account for a new interval of possible solutions. The resulting cross-plot reduces to a form similar to that shown in FIG. 4, above.

EXAMPLE

The application of the present techniques to an exemplary synthetic reservoir model is described in this section. Although the reservoir model discussed herein is synthetic, it has the geologic features that characterize fluid flow in a deep-water depositional environment.

Figure 6:
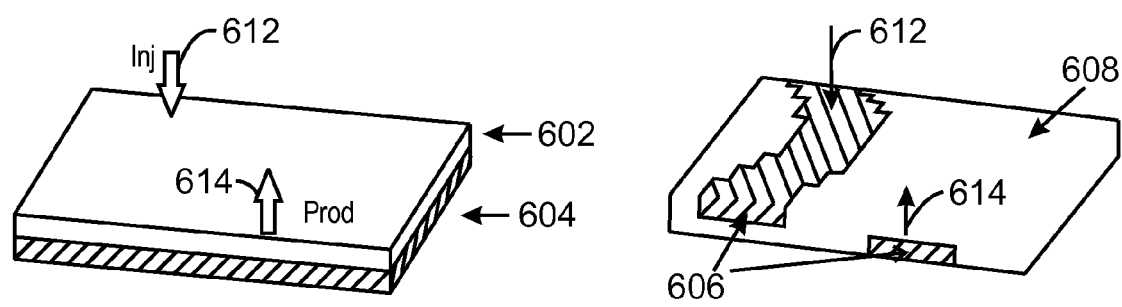
FIG. 6 is a diagram of a simulation model showing the critical flow components of a deep-water system, in accordance with an embodiment of the present techniques.
Figure 6:
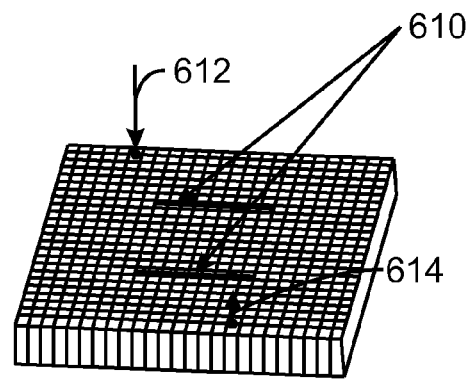

FIG. 6 is a diagram of a simulation model 600 of a reservoir showing flow components of a deep-water system. The simulation model has two geologic units, Unit0 602 and Unit1 604, with each of the units 602 and 604 having two environments of depositional (EOD): a channel axis (EOD1) 606 and a channel margin (EOD0) 608. The channel axis 606 includes good quality reservoir rock, which may contain the highest concentration of recoverable hydrocarbons. Further, two structural or stratigraphic faults 610 cross both units 602 and 604. As illustrated in FIG. 6, the simulation model used in the present example has one injector 612 for the injection of water or other fluids to assist production, and one producer 614 for the removal of hydrocarbon or production fluids.

Figure 7:
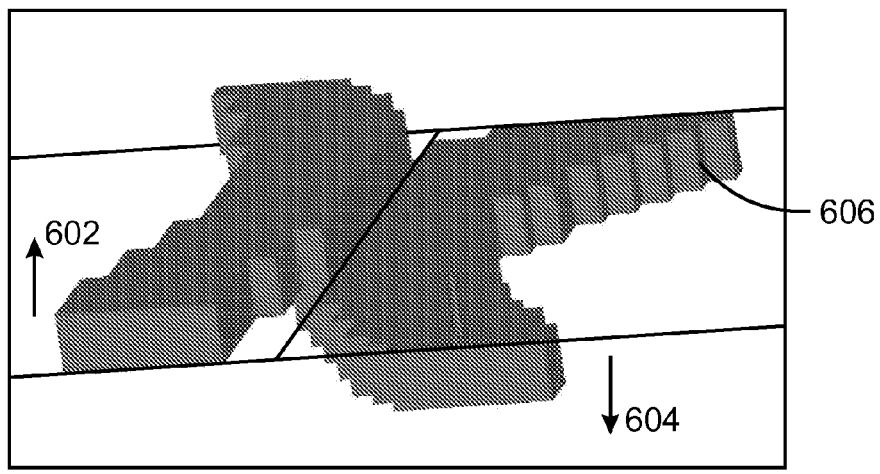
FIG. 7 is a diagram of a channel axis between two geologic units, in accordance with an embodiment of the present techniques.

FIG. 7 is a diagram 700 of the channel axis 606 between the two geologic units 602 and 604, in accordance with an embodiment of the present techniques. As shown in the diagram 700, the channel trajectories in the units are offset, but cross over in the middle of the model over a small area.

Figure 8:
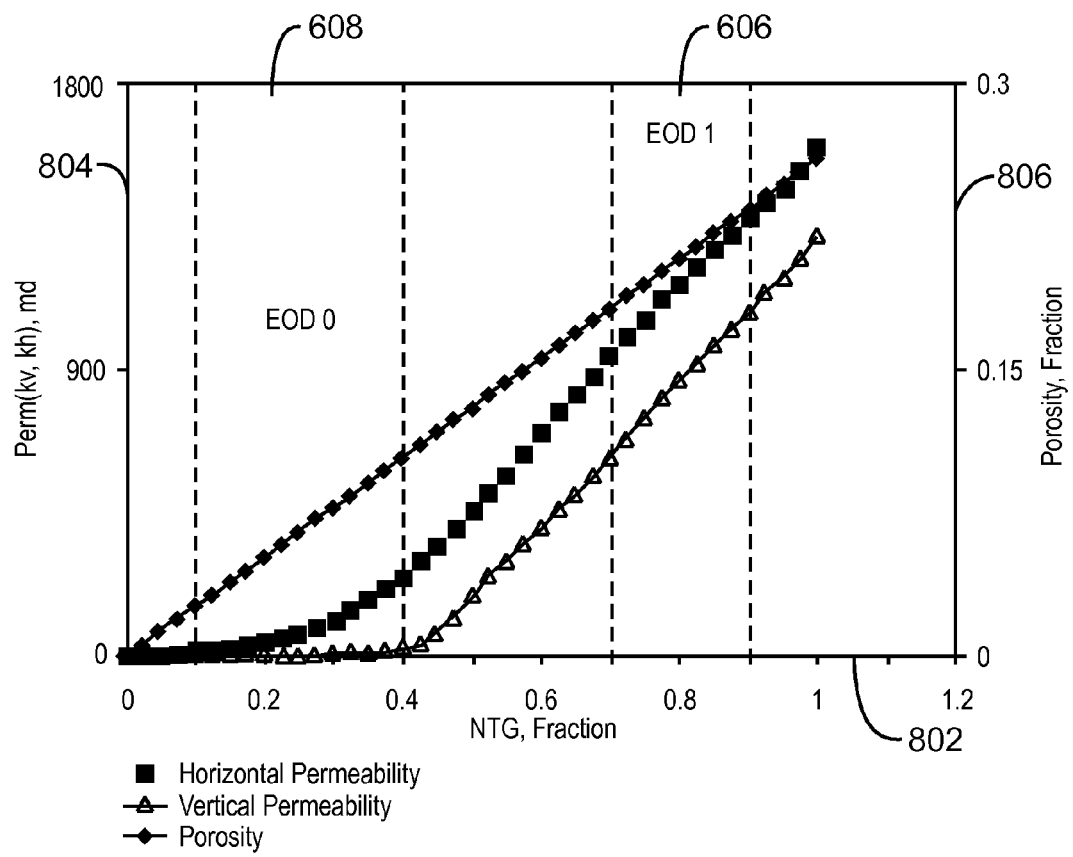
FIG. 8 is a graph of geologically consistent property relationships, in accordance with an embodiment of the present techniques.

FIG. 8 is a graph 800 of geologically consistent property relationships, in accordance with an embodiment of the present techniques. The relationships shown in FIG. 8 are used to assign properties to individual cells for both geologic units 602 and 604. The x-axis is the net-to-gross (NTG) value 802 for a given EOD. The first y-axis 804 charts the permeability of the formation, while the second y-axis 806 charts the porosity of the formation. Referring also to FIGS. 6 and 7, the simulation model 600 may include properties assigned to individual cells that include both geologic units 602 and 604 and the two EODs 606 and 608. In each geologic unit 602 and 604, the NTG 802 for each cell is determined by the environment of deposition (EOD) 606 and 608 assigned to that cell. Further, for each cell in the simulation model, static reservoir properties such as porosity, horizontal and vertical permeability of each grid block in the simulation model are based on established geologic relationships with the NTG values 802 in that cell. This relationship is generated for each geologic unit 602 and 604. Thus for each cell, based on the NTG value 802, the porosity, horizontal and vertical permeability values are obtained.

Problem Definition

Referring also to FIG. 6, in simulation model 600, the water injection rate is set in the injector 612 and the pressure is set in the producer 614. The phase rates at the producer 614 (i.e., the amount of each phase being produced) and the pressure at the injector 612 are determined by running the simulation for a reference set of parameters where the reservoir model properties are set at arbitrary values. For the purposes of this example, these rates and pressures are the "historical data" to be matched.

Figures 9A, 9B:
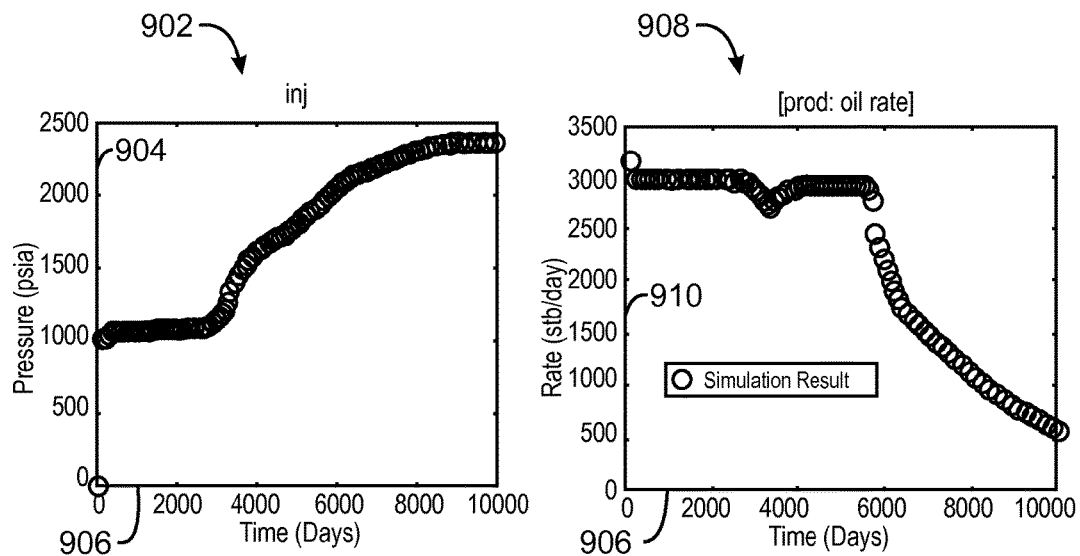
FIGS. 9A-9C illustrate synthetic production data based on a 'reference' set of reservoir properties, in accordance with an embodiment of the present techniques.
Figure 9C:
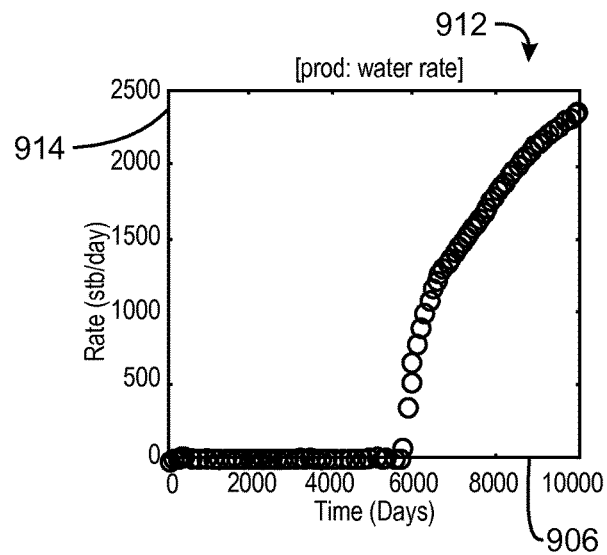

FIGS. 9A-9C illustrate production data based on a 'reference' set of reservoir properties. FIG. 9A shows a graph 902 of the pressure 904 in the injector 612 over a 10,000 day period shown along the x-axis 906. FIG. 9B shows a graph 908 of the oil production rate 910 during this same period (measured along x-axis 906). FIG. 9C is a graph 912 of the water production rate 914 over the same period (measured along x-axis 906).

The goal of the assisted history matching is to modify model parameters (for example, permeability and porosity) so the simulation model performance matches the "historical data." Ideally, doing so would allow the reconstruction of a reference set of parameters, starting with a different set of properties. However, there may be more than one set of parameters that match the reference. The set of properties to be adjusted to obtain a match with the synthetic historical data are unknown variables as discussed below.

Model Parameterization

In this simulation model, the unknown variables are the primary static variables for each cell (porosity, horizontal and vertical permeability), the level of communication across the faults, and the communication between the units. The inter-unit communication is further split into three variables depending on the overlapping environments of deposition. Thus, inter-unit channel-on-channel, margin-on-channel, and margin-on-margin overlap are individually assigned a variable. There may be uncertainty associated with the inherent relationship between the static properties and NTG. For example, the functional relationship between permeability, porosity, and NTG, as depicted in FIG. 8 is an unknown variable for each environment of deposition.

The number of primary variables (factors) may be condensed to six. These include two variables ("ntg0" and "ntg1") that are used to determine the porosity and horizontal and vertical permeability of each cell in the model, for example, using the relationship discussed with respect to FIG. 8. The term "ntg0" represents the NTG ratio in Unit 0 602, and "ntg1" represents the NTG in Unit 1 604 (FIG. 8). Within each unit 602 and 604, NTG depends on EOD 606 and 608. Further, a variable (for example, "flt34") may be used to represent the fault transmissibility, and another is used to represent the inter-unit transmissibility (for example, "unit01"). Finally, a pair of variables (for example, "table0" and "table1") may be used to represent the functional relationships between NTG and reservoir properties for each EOD 606 and 608.

Experimental Design and Initial Screening Filter

FIGS. 10A and 10B show a chart 1000 illustrating a full factorial experimental design performed on the six factors (ntg0, ntg1, flt34, unit01, table0, and table 1), each of which is shown as a column in the design. To model the uncertainty associated with the factors, lower values (corresponding to −1), upper values (corresponding to 1), and midpoint values (corresponding to 0) values were assigned to each of the six variables, and a two-level full factorial experimental design with a center-point case was generated. As illustrated in FIG. 10, this provided a total of 65 runs, based on six factors at two levels (High and Low) and a midpoint case 1002, i.e., 64+1.

Figure 11:
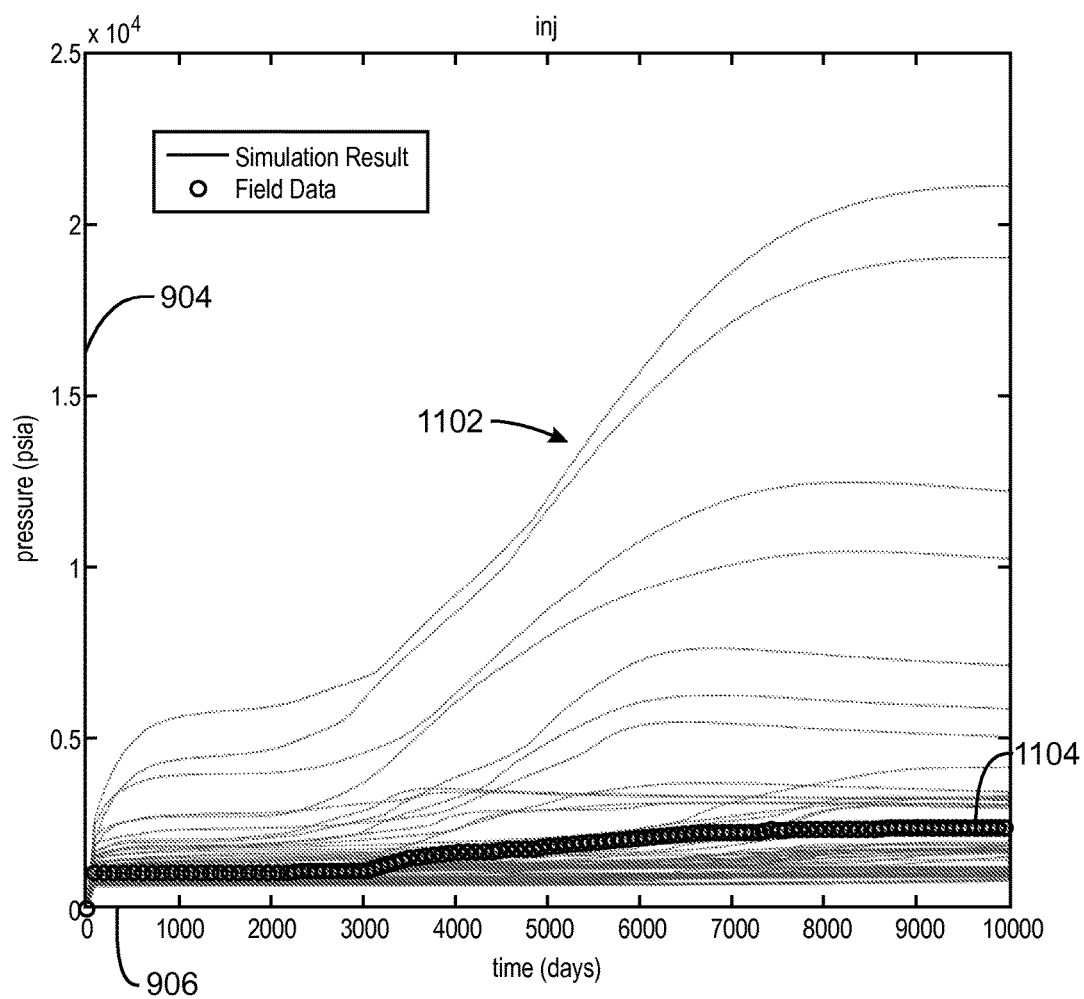
FIG. 11 is a graph of the simulation results versus the historical data for water injection pressure, in accordance with an embodiment of the present techniques.
Figure 12:
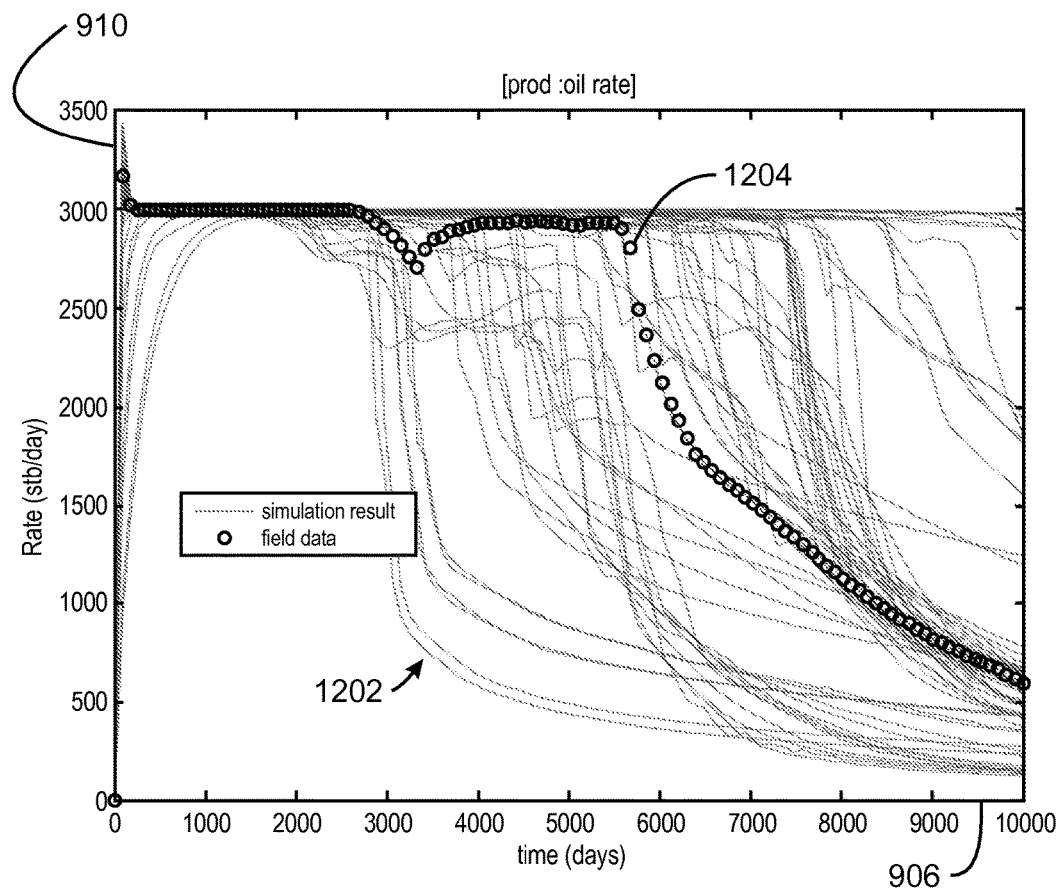
FIG. 12 is a graph of the simulation results versus the historical data for the oil production rate, in accordance with an embodiment of the present techniques.
Figure 13:
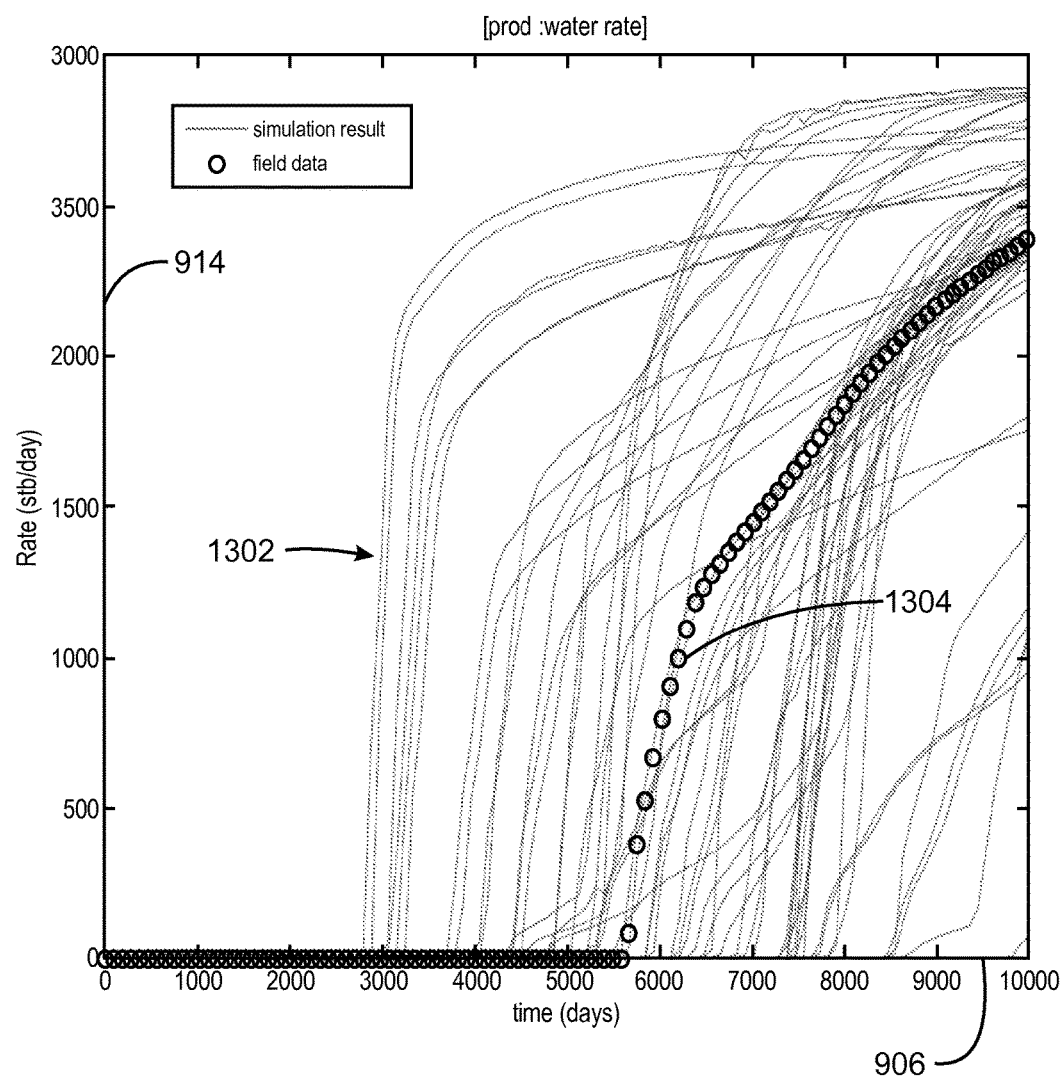
FIG. 13 is a graph 1600 of the simulation results versus the historical data for the water production rate, in accordance with an embodiment of the present techniques.

In this example, the reservoir simulation was run for each of the 65 scenarios on the same boundary conditions as the reference scenario. The resulting comparisons of the simulation results with the historical data are shown in FIGS. 11-13. The y-axis and the x-axis in each of the graphs of FIGS. 11-13 are defined in the same way as in FIGS. 9A-9C, respectively. The collective responses encompass the reference profile (historical data), which indicates that the reference value for each factor lies within the assigned range.

FIG. 11 is a graph 1100 of the simulation results 1102 versus the historical data 1104 for water injection pressure, in accordance with an embodiment of the present techniques. The historical data 1104, shown in FIG. 11 as a series of circles (each of which represents a measurement), corresponds to the data shown in graph 902 of FIG. 9A. FIG. 12 is a graph 1200 of the simulation results 1202 versus the historical data 1204 for the oil production rate, in accordance with an embodiment of the present techniques. The historical data 1204, shown in FIG. 12 as a series of circles, corresponds to the data shown in graph 908 of FIG. 9B. Finally, FIG. 13 is a graph 1300 of the simulation results 1302 versus the historical data 1304 for the water production rate, in accordance with an embodiment of the present techniques. The historical data 1304, shown in FIG. 13 as a series of circles, corresponds to the data shown in graph 912 of FIG. 9C.

Figures 14A, 14B:
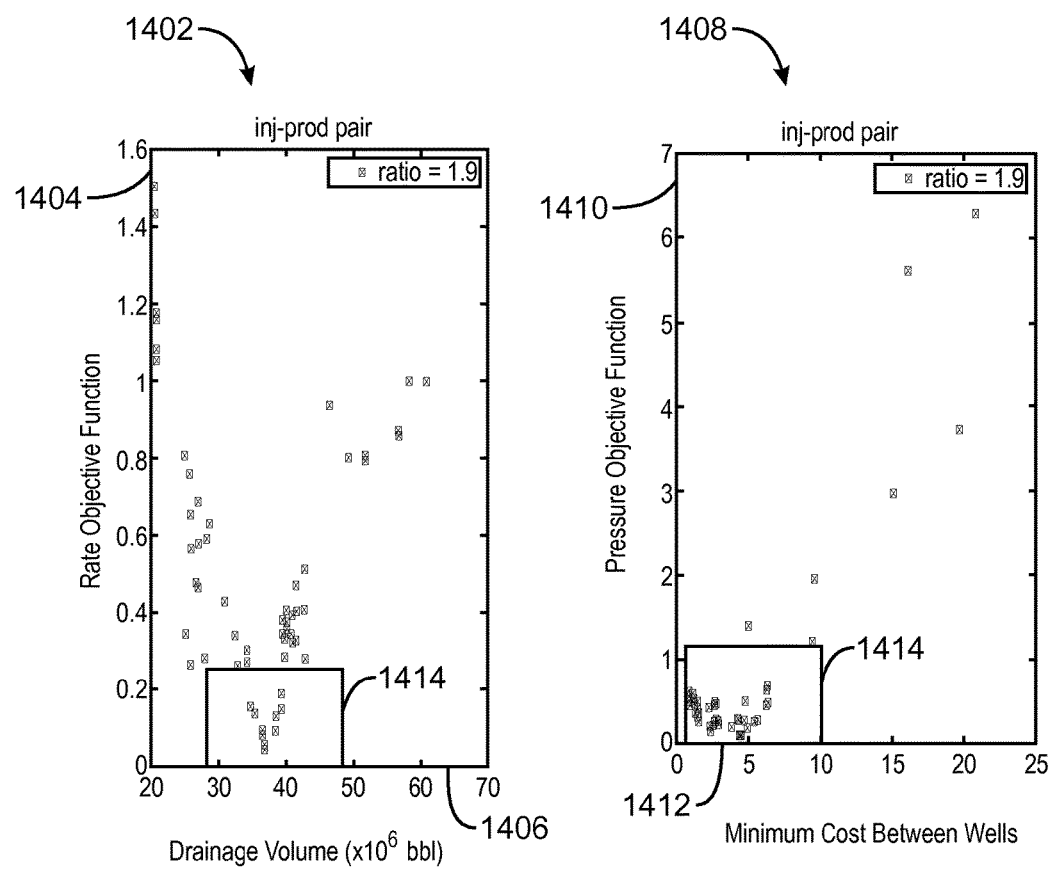
FIGS. 14A and 14B are graphs of two static classifiers generated from the results of the initial experimental design, in accordance with an embodiment of the present techniques.

FIGS. 14A and 14B are graphs of two static filters generated from the results of the initial experimental design. For each of the 65 scenarios in the experimental design, a pre-simulation calculation of the drainage volume was performed using SPA's. The objective function for each of the experimental models was calculated after the simulation based on the simulation results and the reference. With these calculated quantities, relationships between the static measures and the production response are generated, as shown in FIGS. 14A and 14B. The first static classifier 1402 has the rate objective function along the y-axis 1404 and the drainage volume (DV) along the x-axis 1406. The second static classifier 1408 has the pressure objective function along the y-axis 1410 and the minimum cost between wells (as measured from the SPA) on the x-axis 1412. In an exemplary embodiment of the present techniques, an initial window 1414 may be defined in the static classifiers (for example, 1402 and 1404). The initial window 1414 may be useful for screening simulation models. Although each of the experimental models in the design were simulated in this example, the window 1414 may be used to eliminate runs from the simulation, for example, by only simulating runs within the window.

Although the window 1414 would not be defined for the first design, which is generally used for identifying the one or more controlling parameters, the window 1414 may be useful to improve the efficiency of the optimization algorithm in subsequent iterations. For example, for each new set of parameters or parameter values determined by the optimizer, a new model may be constructed, a static measurement of the drainage volume against the history data could be computed, and the objective function value could be estimated from the static measurement, and used to decide whether to run a simulation for that model. If the drainage volume between wells is outside the desired window 1414, the objective function may be set to an arbitrarily high value without running the simulation and a new set of model parameters is generated by the optimizer based on that result. The techniques discussed herein may then be applied to the new models to minimize the objective function. During the optimization loop, those simulation models that satisfy the screening filter are run and constitute an additional source of information for the dynamic update of the screening criteria.

Figure 15:
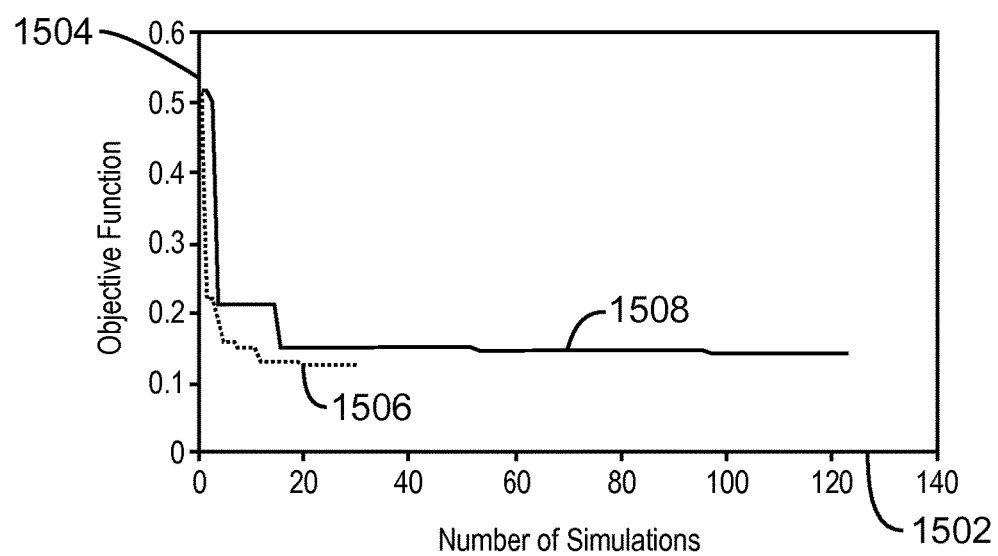
FIG. 15 is a graph of the objective function (f(x)) versus the number of simulations run, in accordance with an embodiment of the present techniques.

FIG. 15 is a graph 1500 of the objective function as a function of the number of simulations run, in accordance with embodiments of the present techniques. In the graph 1500, the x-axis 1502 represents the number of simulations run on a model, while the y-axis 1504 represents the objective function that measures the mismatch between the simulation results and the historical data. The plot shows a first line 1506 that represents the results using the present techniques. A second line 1508 shows when the screening techniques were not used. As can be seen in FIG. 15, the present techniques provide a more efficient method for optimization than known techniques that do not use a screening technique as described herein.

Table 1 recasts the results shown in FIG. 15 in terms of the number of models tested. When relationships between PV, minimum cost, and objective function were used, fewer models were tested and even fewer simulations were run, suggesting the value of the static calculations. Use of static calculations restricted the optimizer to a parameter space where the objective function is most likely to be improved. The result was a more rapid narrowing of the parameter space.

TABLE 1

Comparison of optimization results with and without the classifier.

|  | With Filter | Without Filter |
| --- | --- | --- |
| Simulated | 30 | 123 |
| Discarded | 29 | 0 |
| Lowest Objective Function | 0.136 | 0.143 |

Systems

Figure 16:
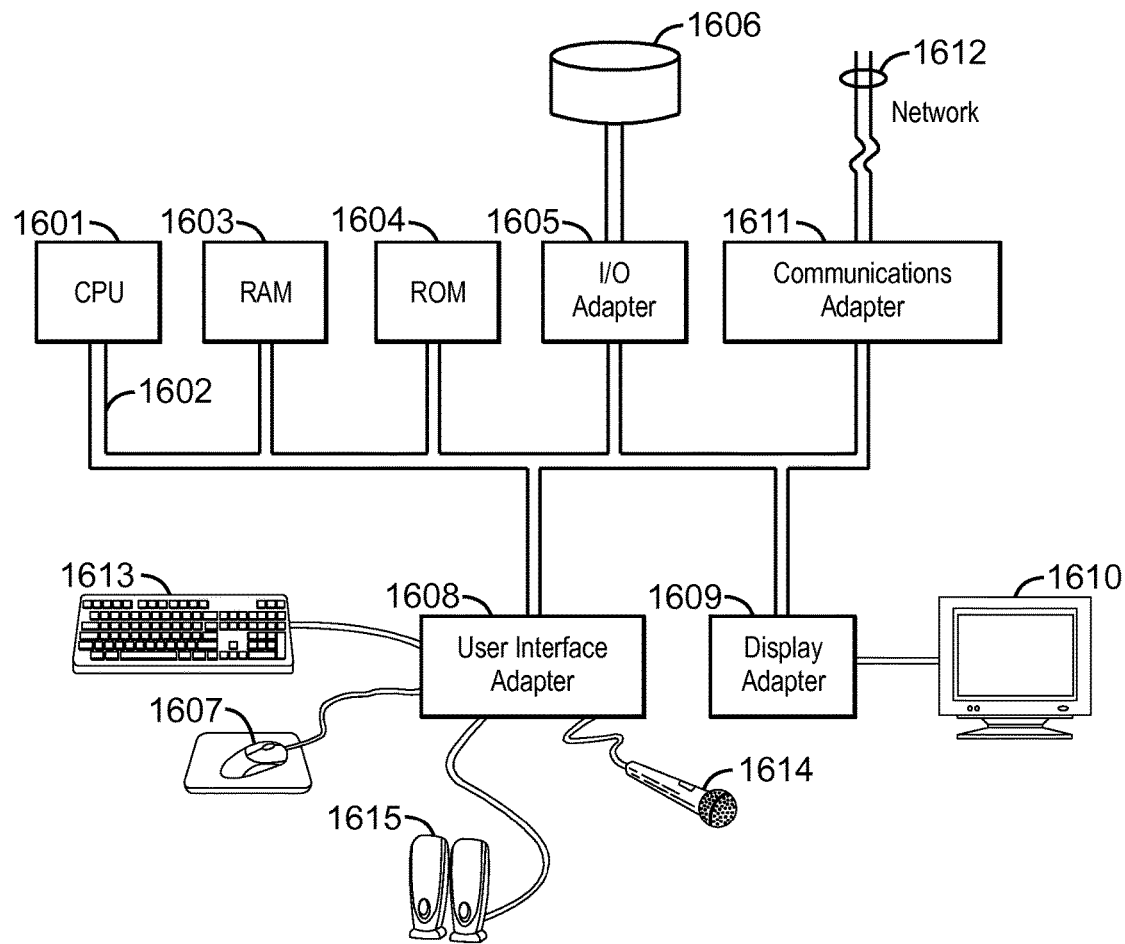
FIG. 16 illustrates an exemplary computer system on which software for performing processing operations of embodiments of the present invention may be implemented.

The techniques discussed herein may be implemented on a computing device, such as that illustrated in FIG. 16. FIG. 16 illustrates an exemplary computer system 1600 on which software for performing processing operations of embodiments of the present invention may be implemented. A central processing unit (CPU) 1601 is coupled to a system bus 1602. In embodiments, the CPU 1601 may be any general-purpose CPU. The present invention is not restricted by the architecture of CPU 1601 (or other components of exemplary system 1600) as long as the CPU 1601 (and other components of system 1600) supports the inventive operations as described herein. The CPU 1601 may execute the various logical instructions according to embodiments. For example, the CPU 1601 may execute machine-level instructions for performing processing according to the exemplary operational flow described above in conjunction with FIGS. 1 and 3. As a specific example, the CPU 1601 may execute machine-level instructions for performing the methods of FIGS. 1 and 3.

The computer system 1600 may also includes random access memory (RAM) 1603, which may be SRAM, DRAM, SDRAM, or the like. In an exemplary embodiment of the present techniques, the RAM 1603 is used to store the machine level instructions used by the processor 1601 to implement the method of FIGS. 1 and 3. The computer system 1600 preferably includes read-only memory (ROM) 1604 which may be PROM, EPROM, EEPROM, or the like. The RAM 1603 and the ROM 1604 hold user and system data and programs, as is well known in the art.

The computer system 1600 also preferably includes an input/output (I/O) adapter 1605, a communications adapter 1611, a user interface adapter 1608, and a display adapter 1609. The I/O adapter 1605, user interface adapter 1608, and/or communications adapter 1611 may, in certain embodiments, enable a user to interact with computer system 1600 in order to input information.

The I/O adapter 1605 preferably connects storage device (s) 1606, such as one or more of a hard drive, compact disc (CD) drive, floppy disk drive, tape drive, flash drives, USB connected storage, etc. to computer system 1600. The storage devices may be utilized when RAM 1603 is insufficient for the memory requirements associated with storing data for operations of embodiments of the present invention. The data storage of computer system 1600 may be used for storing such information as historical data, experimental models, simulation models, and the code used to implement the method steps shown in FIGS. 1 and 3, and/or other data used or generated in accordance with embodiments of the present invention.

The communications adapter 1611 is preferably adapted to couple the computer system 1600 to a network 1612, which may enable information to be input to and/or output from the system 1600 via the network 1612, for example, the Internet or other wide-area network, a local-area network, a public or private switched telephony network, a wireless network, or any combination of the foregoing. The user interface adapter 1608 couples user input devices, such as a keyboard 1613, a pointing device 1607, and a microphone 1614 and/or output devices, such as speaker(s) 1615 to computer system 1600. The display adapter 1609 is driven by the CPU 1601 to control the display on the display device 1610, for example, to display information pertaining to a target area under analysis, such as displaying a generated 3D representation of the target area, according to certain embodiments.

It shall be appreciated that the present invention is not limited to the architecture of the computer system 1600 illustrated in FIG. 16. For example, any suitable processor-based device may be utilized for implementing all or a portion of embodiments of the present invention, including without limitation personal computers, laptop computers, computer workstations, and multi-processor servers. Moreover, embodiments may be implemented on application specific integrated circuits (ASICs) or very large scale integrated (VLSI) circuits. In fact, persons of ordinary skill in the art may utilize any number of suitable structures capable of executing logical operations according to the embodiments.

While the present techniques may be susceptible to various modifications and alternative forms, the exemplary embodiments discussed above have been shown only by way of example. However, it should again be understood that the present techniques are not intended to be limited to the particular embodiments disclosed herein. Indeed, the present techniques include all alternatives, modifications, and equivalents falling within the true spirit and scope of the appended claims.

What is claimed is:

1. A method for enhancing a production history matching process, the method comprising:
obtaining production data and an initial subsurface model;
determining an experimental design including one or more model parameter sets;
for each of the model parameter sets in the experimental design:
calculating a value for a static measurement, wherein the static measurement comprises a measurement of connectivity in a geologic model between two wells in the subsurface model, two compartments in the subsurface model or between two locations in the subsurface model identified as well locations, wherein the static measurement is a property measurement associated with a subsurface region, and wherein the subsurface region includes one or more of structure components, reservoir architecture components, rock type components, and petrophysics components, wherein the connectivity includes transmissibility that is the volumetric flow rate between two points at unit viscosity for a given pressure drop;
performing, using a computer, at least one flow simulation to generate results; and
comparing the generated results with the production data via an objective function to provide an objective function value;
determining relationships between the objective function values for the model parameter sets in the experimental design and the static measurements;
determining a screening filter based at least in part on relationships between the static measurements and the objective function values for the model parameter sets in the experimental design; and
for subsequent model parameter sets:
calculating a static measurement associated with each of the subsequent model parameter sets;
performing a history match process for each of the subsequent model parameter sets that satisfies the screening filter.

2. The method of claim 1, wherein determining the experimental design comprises identifying a plurality of parameters in the model parameter set that control objective function values.

3. The method of claim 1, wherein determining the screening filter comprises:
identifying a target window in the objective function; and
determining from the relationships a range of values for the static measurement wherein an objective function will be within the target window.

4. The method of claim 3, wherein identifying the target window comprises selecting ranges for the objective function that encompass a minimum.

5. The method of claim 1, wherein performing the history match process comprises performing a flow simulation for the subsequent model parameter sets in which a value for the objective function is predicted to be within a current target window.

6. The method of claim 5, further comprising:
identifying a new target window in the objective function, wherein the new target window is smaller than the current target window;
determining a new design experiment to explore a smaller parameter subspace;
calculating the static measurement at each of the subsequent model parameter sets from the new design experiment;
estimating an objective function value for each of the subsequent parameter sets based on the associated static measurement;
performing a flow simulation for each of the new model parameter sets for which the estimated objective function value is within the new target window; and
calculating an objective function value for each flow simulation.

7. The method recited in claim 1, wherein the model parameter sets comprise fault transmissibility, net-to-gross, porosity, permeability, unit transmissibility, or any combinations thereof.

8. The method of claim 1, wherein the connectivity comprises transmissibility, pore volume, drainage volume, shortest path cost, transit time, or any combinations thereof.

9. The method of claim 1, comprising performing a shortest path algorithm on the subsurface model to obtain each static measurement.

10. The method recited in claim 1, wherein the experimental design comprises a screening design, a full factorial design, a fractional factorial design, a Latin hypercube design, a D-Optimal design, or any combinations thereof.

11. The method of claim 1, further comprising performing a static reservoir engineering analyses to identify the static measurement wherein performing the static reservoir engineering analyses comprises defining drainage volumes around producers or between injectors and producers, permeability-thickness around wells, pore volume of flow units or fault blocks, and shortest-path costs between injectors and producers.

12. The method of claim 1, wherein for each of subsequent model parameter sets, calculating the static measurement associated with each of the subsequent model parameter sets calculation is performed prior to simulating the each of the subsequent model parameter sets.

13. The method of claim 1, wherein the relationships between the static measurements and the objective function values is based on one of a rate mismatch as a function of drainage volume between wells, breakthrough time mismatch as a function of drainage volume between wells, early-time pressure at injectors as a function of permeability-thickness, pressure decline as a function of fault block pore volume, pressure decline as a function of fault seal, or any combinations thereof.

14. A method for producing hydrocarbons from a field comprising:
calculating a value for a static measurement, wherein the static measurement comprises a measurement of connectivity in a geologic model, wherein the static measurement is a property measurement associated with a subsurface region, and wherein the subsurface region includes one or more of structure components, reservoir architecture components, rock type components, and petrophysics components, wherein the connectivity includes transmissibility that is the volumetric flow rate between two points at unit viscosity for a given pressure drop;
performing at least one flow simulation with an initial reservoir model to generate results;
comparing the generated results with production data by calculating an objective function that quantifies the difference between simulation results and field measurement to provide an objective function value;
determining a relationship between the objective function value and the static measurement;
identifying a target window in the objective function based on the relationship;
determining from the relationship a range of values for the static measurement wherein an objective function is within the target window;
generating, using a computer, a reservoir model,
calculating a value for the static measurement of the reservoir model;
matching the reservoir model to a production history from the field by using the value as a surrogate for flow simulations in a calculation of a value for an objective function;
performing flow simulations for one or more model parameter sets that are indicated as being within the target window by the value;
adjusting the reservoir model to optimize the objective function; and
adjusting control of hydrocarbon production from the field based at least in part on the reservoir model or the adjusted reservoir model.

15. The method of claim 14, wherein adjusting control of the hydrocarbon production from the field based at least in part on the reservoir model comprises changing injection pressures, converting injectors to producers, converting producers to injectors, drilling more wells to the reservoir, or any combinations thereof.

16. The method of claim 14, wherein the static measurements comprise transmissibility, pore volume, drainage volume, shortest path cost, transit time, or any combinations thereof.

17. A non-transitory, machine-readable medium, comprising code configured to direct a processor to:
determine an experimental design including one or more model parameter sets in a parameter subspace;
calculate a value for a static measurement for each of the one or more model parameter sets, wherein the static measurement comprises a measurement of connectivity in a geologic model, wherein the static measurement is a property measurement associated with a subsurface region, and wherein the subsurface region includes one or more of structure components, reservoir architecture components, rock type components, and petrophysics components, wherein the connectivity includes transmissibility that is the volumetric flow rate between two points at unit viscosity for a given pressure drop;
determine an objective function value based on the static measurement for each of the one or more model parameter sets;
determine relationships between the objective function values and the static measurements for the one or more model parameter sets;
identify a target window in the objective function based on the relationships;
perform a flow simulation for each of the one or more model parameter sets for which the objective function value is within the target window based on the relationships; and
calculate the objective function value of each flow simulation.

18. The non-transitory, machine-readable medium of claim 17, comprising code configured to direct the processor to iterate an optimization procedure until the objective function value is within a target range.

19. The non-transitory, machine-readable medium of claim 17, comprising code configured to direct the processor to minimize the objective function for the static geologic model and run a flow simulation at a set of parameters identified with the optimum.

20. The non-transitory, machine-readable medium of claim 17, comprising code configured to direct a processor to coordinate the operation of an optimizer with the operation of a flow simulator, wherein the optimizer is configured to generate a model parameter set that has an objective function value within a target window and the flow simulator is configured to perform a flow simulation based on the model parameter set from the optimizer.

21. The non-transitory, machine readable medium of claim 17, comprising code configured to direct a processor to generate a display of a graphical representation of the objective function values.

* * * * *